US009275313B2

(12) United States Patent
Kojima

(10) Patent No.: US 9,275,313 B2
(45) Date of Patent: Mar. 1, 2016

(54) PRINTING APPARATUS CAPABLE OF SPECIFYING AND STORING USER DEFINED ENVELOPE FLAP SIZES

(71) Applicant: CANON KABUSHIKI KAISHA, Tokyo (JP)

(72) Inventor: Nobuyuki Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/758,949

(22) Filed: Feb. 4, 2013

(65) Prior Publication Data
US 2013/0215437 A1 Aug. 22, 2013

(30) Foreign Application Priority Data

Feb. 21, 2012 (JP) .................. 2012-035466

(51) Int. Cl.
| G06K 15/10 | (2006.01) |
| G06K 15/00 | (2006.01) |
| G06K 15/02 | (2006.01) |
| B41J 3/46 | (2006.01) |
| B41J 13/12 | (2006.01) |

(52) U.S. Cl.
CPC . *G06K 15/10* (2013.01); *B41J 3/46* (2013.01); *B41J 13/12* (2013.01); *G06K 15/005* (2013.01); *G06K 15/021* (2013.01); *G06K 15/4065* (2013.01)

(58) Field of Classification Search
CPC ............................. G06K 15/10; G06K 15/16
USPC .......... 358/1.5, 1.6; 399/16, 21, 395; 271/227
See application file for complete search history.

(56) References Cited

U.S. PATENT DOCUMENTS 3,951,264 A 4/1976 Heidecker et al.
4,656,602 A * 4/1987 Berkland .............. G06F 3/1297
358/1.18

(Continued)

FOREIGN PATENT DOCUMENTS

CN 1453652 A 11/2003
CN 1637643 A 7/2005

(Continued)

OTHER PUBLICATIONS

U.S. Appl. No. 13/755,960, filed Jan. 31, 2013. Applicant: Masayuki Yamada.

(Continued)

*Primary Examiner* — Peter K Huntsinger
*Assistant Examiner* — Edwin S Leland, III
(74) *Attorney, Agent, or Firm* — Fitzpatrick, Cella, Harper & Scinto

(57) ABSTRACT

A printing apparatus according to one aspect of this invention includes a sheet holding unit configured to hold an envelope, a first setting unit configured to set a standard-size of an envelope for the sheet holding unit and a second setting unit configured to set an additional size attached to the standard-size for the sheet holding unit. The printing apparatus further includes a storage unit configured to store the standard-size and the additional size attached to the standard-size for the sheet holding unit, and a presentation unit configured to, when a standard-size of an envelope is newly set for the sheet holding unit, acquire the additional size attached to the set standard-size from the storage unit and present the additional size.

8 Claims, 23 Drawing Sheets

(56) References Cited

U.S. PATENT DOCUMENTS

| | | | | |
|---|---|---|---|---|
| 5,000,592 A * | 3/1991 | Grady | G06F 17/243 | 400/68 |
| 5,154,405 A * | 10/1992 | Graveson | B43M 5/042 | 271/184 |
| 5,297,376 A * | 3/1994 | Taguchi | B43M 5/042 | 53/168 |
| 5,819,666 A * | 10/1998 | Ishikawa | B43M 5/042 | 101/483 |
| 6,042,099 A * | 3/2000 | Takagishi | B65H 3/5261 | 271/114 |
| 6,825,941 B1 * | 11/2004 | Nguyen | G06F 3/1227 | 358/1.13 |
| 6,895,195 B2 | 5/2005 | Katamoto | | |
| 6,982,808 B1 * | 1/2006 | Ogg | G07B 17/00508 | 358/1.18 |
| 7,079,781 B2 | 7/2006 | Suzuki | G03G 15/235 | 399/364 |
| 7,139,503 B2 | 11/2006 | Mizusawa | | |
| 7,268,897 B1 * | 9/2007 | Moro | G06K 15/00 | 358/1.13 |
| 7,284,753 B2 | 10/2007 | Kotani | | |
| 8,264,720 B2 | 9/2012 | Sugiyama | | |
| 8,305,608 B2 * | 11/2012 | Saito | G06F 3/1211 | 283/67 |
| 8,330,783 B2 | 12/2012 | Salvestro | | |
| 8,469,201 B2 * | 6/2013 | Sasaki | G03G 15/6538 | 209/592 |
| 8,529,056 B2 | 9/2013 | Nakagawa et al. | | |
| 8,777,207 B2 | 7/2014 | Nishiyama | | |
| 2001/0024295 A1 * | 9/2001 | Tachibana | B41J 13/0018 | 358/1.15 |
| 2002/0023057 A1 * | 2/2002 | Goodwin | G06Q 30/02 | 705/50 |
| 2002/0110397 A1 * | 8/2002 | Bussell | G07B 17/0008 | 400/104 |
| 2003/0061322 A1 * | 3/2003 | Igarashi | H04L 29/12009 | 709/223 |
| 2003/0202808 A1 * | 10/2003 | Katamoto | G03G 15/50 | 399/45 |
| 2004/0124242 A1 * | 7/2004 | Critelli | G07B 17/00508 | 235/462.08 |
| 2004/0131405 A1 * | 7/2004 | Mizusawa | G03G 21/0035 | 399/353 |
| 2005/0189694 A1 * | 9/2005 | Kotani | B41J 11/0095 | 271/9.09 |
| 2006/0151938 A1 * | 7/2006 | Bauvin | B65H 1/14 | 271/113 |
| 2009/0002752 A1 * | 1/2009 | Sugiyama | G03G 21/02 | 358/1.15 |
| 2010/0067050 A1 * | 3/2010 | Matsuura | H04N 1/00204 | 358/1.15 |
| 2010/0165407 A1 * | 7/2010 | Witkowski | B42D 15/02 | 358/1.18 |
| 2010/0225933 A1 * | 9/2010 | Xiao | G06F 3/1205 | 358/1.2 |
| 2010/0289841 A1 * | 11/2010 | Nakagawa | B41J 11/0015 | 347/6 |
| 2010/0295235 A1 * | 11/2010 | Kanamoto | B65H 43/00 | 271/9.01 |
| 2010/0309273 A1 * | 12/2010 | Salvestro | B41J 2/465 | 347/188 |
| 2010/0314276 A1 * | 12/2010 | Wilen | B42D 5/025 | 206/459.5 |
| 2011/0025037 A1 * | 2/2011 | Wilen | B42D 5/025 | 283/56 |
| 2011/0135325 A1 * | 6/2011 | Hitaka | G03G 15/70 | 399/21 |
| 2011/0184889 A1 * | 7/2011 | Tokita | B65H 1/00 | 705/414 |
| 2011/0277418 A1 * | 11/2011 | Kunieda | B43M 3/045 | 53/117 |
| 2011/0291348 A1 * | 12/2011 | Kaiping | B65H 3/042 | 271/10.06 |
| 2012/0183308 A1 * | 7/2012 | Omori | G03G 15/5029 | 399/16 |
| 2012/0202672 A1 * | 8/2012 | Nishiyama | B41J 13/12 | 493/460 |
| 2012/0229822 A1 * | 9/2012 | Shimoda | G06K 15/021 | 358/1.6 |
| 2012/0250045 A1 * | 10/2012 | Uemura | G06F 3/1208 | 358/1.9 |
| 2013/0140754 A1 * | 6/2013 | Nishiyama | B41J 11/008 | 271/2 |
| 2013/0140767 A1 * | 6/2013 | Inui | B65H 5/00 | 271/264 |
| 2013/0168915 A1 * | 7/2013 | Saito | G03G 15/6529 | 271/2 |
| 2013/0214481 A1 * | 8/2013 | Yamada | B65H 7/20 | 271/227 |
| 2015/0036172 A1 * | 2/2015 | Tachibana | G03G 15/502 | 358/1.14 |

FOREIGN PATENT DOCUMENTS

| | | |
|---|---|---|
| CN | 201151240 Y | 11/2008 |
| CN | 101334715 A | 12/2008 |
| CN | 101830122 A | 9/2010 |
| CN | 101885266 A | 11/2010 |
| CN | 101970240 A | 2/2011 |
| CN | 103129173 A | 6/2013 |
| JP | 6-337560 A | 12/1994 |
| JP | 9-109492 A | 4/1997 |
| JP | 09109492 A * | 4/1997 |
| JP | 2004-138816 A | 5/2004 |
| JP | 2004138816 A * | 5/2004 |
| JP | 2006-91291 A | 4/2006 |
| JP | 2006091291 A * | 4/2006 |
| JP | 2007-69390 A | 3/2007 |
| JP | 2007069390 A * | 3/2007 |
| JP | 2011-101973 A | 5/2011 |
| JP | 2011101973 A * | 5/2011 |

OTHER PUBLICATIONS

Chinese Office Action dated Dec. 1, 2014 issued in corresponding Chinese Patent Application No. 201310055500.0.

Chinese Office Action dated Dec. 10, 2014 issued in corresponding Chinese Patent Application No. 201310056311.5.

\* cited by examiner

F I G. 8A
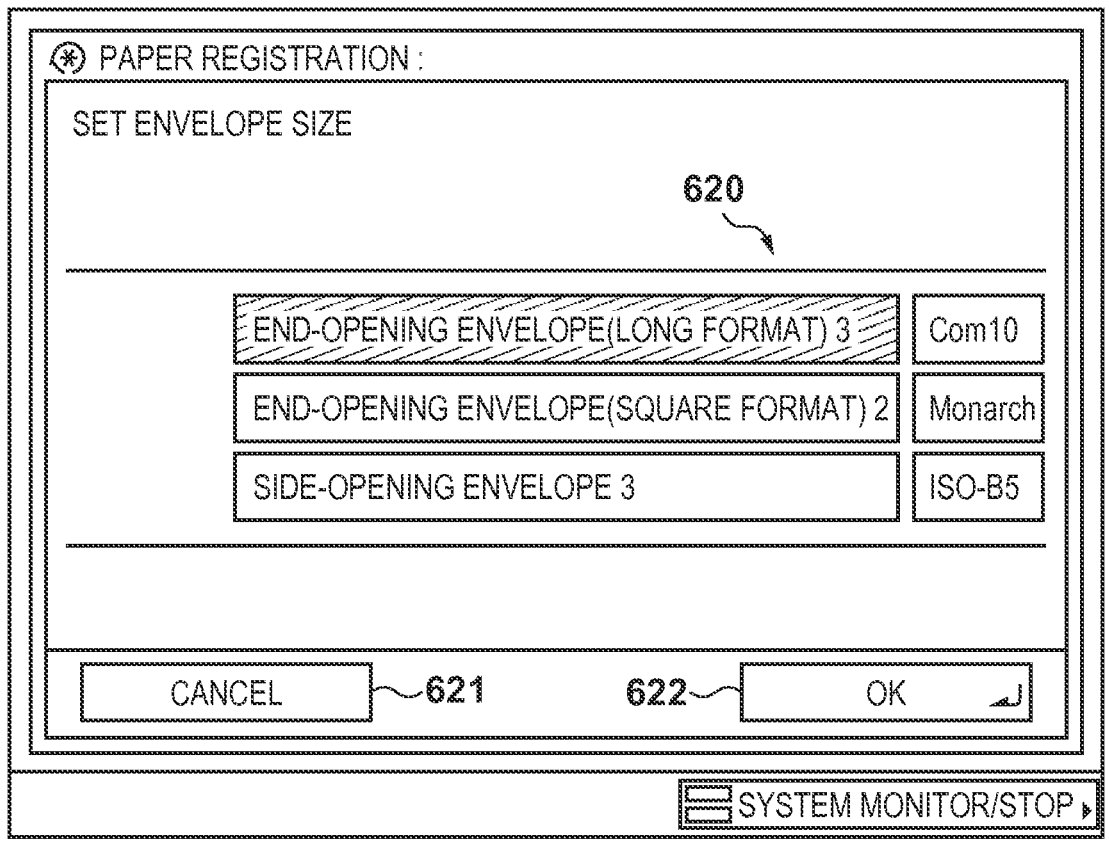

FIG. 8B

PAPER REGISTRATION: SELECTING PAPER SIZE

| THIN PAPER 1 (64~79g/m2) | PLAIN PAPER (80~105g/m2) | THICK PAPER 1 (106~128g/m2) | THICK PAPER 2 (129~150g/m2) |
|---|---|---|---|
| THICK PAPER 3 (151~180g/m2) | THICK PAPER 4 (181~209g/m2) | THICK PAPER 5 (210~256g/m2) | THICK PAPER 6 (257~300g/m2) |
| ONE-SIDE COATED PAPER 1 (80~105g/m2) | ONE-SIDE COATED PAPER 2 (106~128g/m2) | ONE-SIDE COATED PAPER 3 (129~150g/m2) | ONE-SIDE COATED PAPER 4 (151~180g/m2) |
| ONE-SIDE COATED PAPER 5 (181~209g/m2) | ONE-SIDE COATED PAPER 6 (210~256g/m2) | DOUBLE-SIDE COATED PAPER 1 (80~105g/m2) | DOUBLE-SIDE COATED PAPER 2 (106~128g/m2) |
| DOUBLE-SIDE COATED PAPER 3 (129~150g/m2) | DOUBLE-SIDE COATED PAPER 4 (151~180g/m2) | DOUBLE-SIDE COATED PAPER 5 (181~209g/m2) | DOUBLE-SIDE COATED PAPER 6 (210~256g/m2) |

624

CANCEL 625    OK 626

SYSTEM MONITOR/STOP

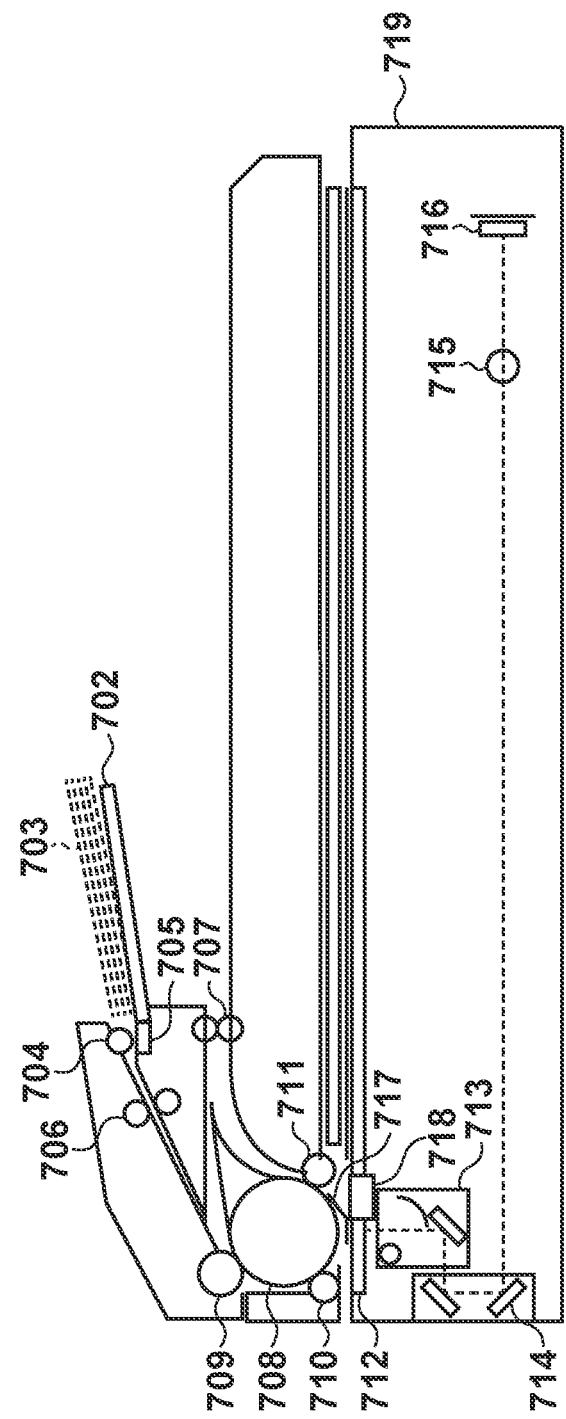

FIG. 13

| ATTRIBUTE ID | TYPE ID | VALUE | MEANING |
|---|---|---|---|
| 10 | 1 | ARBITRARY CHARACTER STRING | JOB NAME |
| 11 | 1 | ARBITRARY CHARACTER STRING | APPLICATION NAME |
| 100 | 2 | 1, 2, 3, 4, 5 or AUTO | PAPER FEED TRAY |
| 101 | 2 | 1, 2, 3, 4 | DISCHARGE TRAY |
| 104 | 2 | 3 | COPY COUNT |
| 401 | 11 | 0~7015, 0~9920 | IMAGE SIZE |
| 402 | 11 | 0~7015, 0~9920 | MOVING AMOUNT |
| 403 | 2 | A4, A3, B5, B4, POSTCARD, END-OPENING ENVELOPE(LONG FORMAT) 3 | PAPER SIZE |
| 404 | 2 | PLAIN PAPER, THICK PAPER, COATED PAPER, ENVELOPE | PAPER TYPE |
| 405 | 2 | 1, 2, 3 | DOUBLE-SIDED |
| 406 | 2 | 1, 2, 3, 4 | BINDING POSITION |

PRINTING APPARATUS CAPABLE OF SPECIFYING AND STORING USER DEFINED ENVELOPE FLAP SIZES

BACKGROUND OF THE INVENTION

1. Field of the Invention

The present invention relates to a printing apparatus capable of printing an image on paper such as an envelope, a control method therefor, and a storage medium.

2. Description of the Related Art

An image forming apparatus (printing apparatus) includes one or more paper containing units. The image forming apparatus feeds sheets contained in the paper containing unit one by one, and forms (prints) an image on the fed sheet. The size of paper contained in each paper containing unit can be set. For example, standard-sizes such as A4 and B4, and an arbitrary size such as 210 mm×290 mm can be set.

As a special standard-size, an envelope size can also be set. Paper with a projection such as the margin (to be referred to as a flap hereinafter) of an envelope or the index portion of index paper is set so that the projection serves as the trailing end in the sub-scanning direction. With this setting, a paper area up to the projection is handled as a standard-size, and printing is performed. Also, there is known a technique of setting an envelope so that its flap is positioned in the sub-scanning direction, recognizing a flap position by a sensor when the envelope is conveyed, and suppressing image misregistration (see Japanese Patent Laid-Open No. 9-109492).

Paper longer in the sub-scanning direction than in the main-scanning direction, like an envelope, takes a long printing time when the long edge is made parallel to the conveyance direction and printing is performed (short-edge feed). The printing time can be shortened by setting paper so that its flap comes to the end in the main-scanning direction, making the short edge of the paper parallel to the conveyance direction, and printing (long-edge feed). In this case, an image needs to be shifted by the flap width and printed. However, since the flap width differs between envelope manufacturers, the user needs to set a flap width as an additional size for each envelope in the printing apparatus.

For example, when the paper containing unit of the paper feed source is a manual feed tray, if envelopes set on the manual feed tray run out, setting information set for the manual feed tray is cleared, as a specification of the manual feed tray. Every time envelopes are set on the manual feed tray, the user needs to set the flap width in addition to the envelope size. This is cumbersome work for the user.

SUMMARY OF THE INVENTION

The present invention solves the conventional problems.

The present invention provides a technique capable of continuing work by storing a previously set additional size for each envelope size, without setting again an additional size by the user.

According to one aspect of the present invention, there is provided a printing apparatus which prints on an envelope, comprising: a sheet holding unit configured to hold an envelope; a first setting unit configured to set a standard-size of an envelope for the sheet holding unit; a second setting unit configured to set an additional size attached to the standard-size for the sheet holding unit; a storage unit configured to store the standard-size and the additional size attached to the standard-size for the sheet holding unit; and a presentation unit configured to, when a standard-size of an envelope is newly set for the sheet holding unit, acquire the additional size attached to the set standard-size from the storage unit and present the additional size.

According to another aspect of the present invention, there is provided a method for controlling a printing apparatus which includes a sheet holding unit configured to hold an envelope, and prints on an envelope, comprising: setting a standard-size of an envelope for the sheet holding unit; setting an additional size attached to the standard-size for the sheet holding unit; storing the standard-size and the additional size attached to the standard-size in a memory for the sheet holding unit; and when a standard-size of an envelope is newly set for the holding unit, acquiring the additional size attached to the set standard-size from the memory and presenting the additional size.

According to the present invention, by storing a previously set additional size for each envelope size, work can continue without setting again an additional size by the user.

Further features of the present invention will become apparent from the following description of exemplary embodiments (with reference to the attached drawings).

BRIEF DESCRIPTION OF THE DRAWINGS

FIGS. 8A and 8B are views each exemplifying a UI screen displayed on the display unit of the operation unit of the MFP according to the embodiment;

FIG. 9 is a view for explaining the structure of a scanner;

FIG. 13 is a table exemplifying attributes according to the embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1:
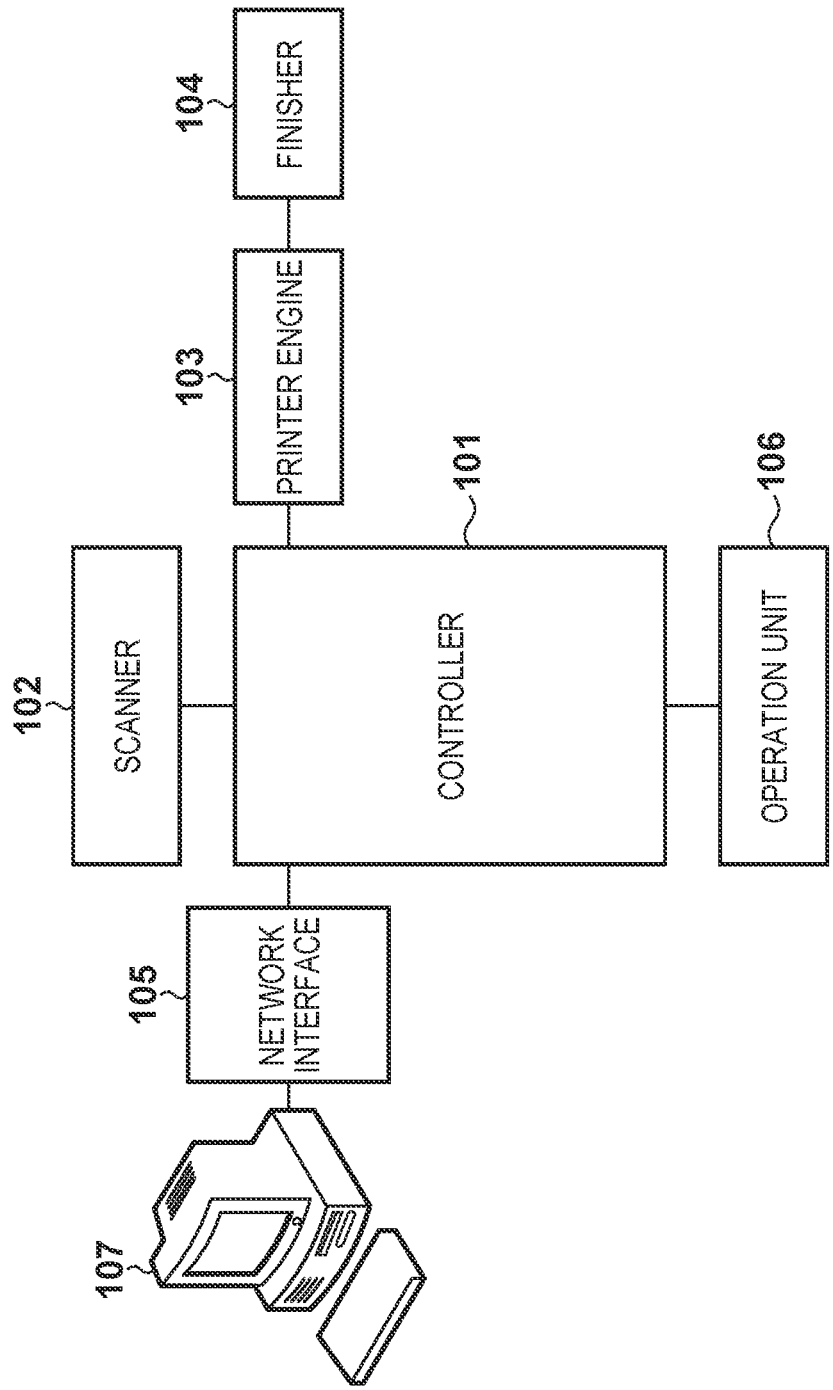
FIG. 1 is a view showing the arrangement of a multifunction peripheral (MFP) serving as an example of an image forming apparatus according to an embodiment.

FIG. 1 is a view showing the arrangement of a multifunction peripheral (MFP) serving as an example of a printing apparatus according to an embodiment of the present invention. Although the embodiment will be explained using the MFP having a plurality of functions as an example of the printing apparatus, the printing apparatus may be a single-function peripheral (SFP) having a single function.

Figure 2:
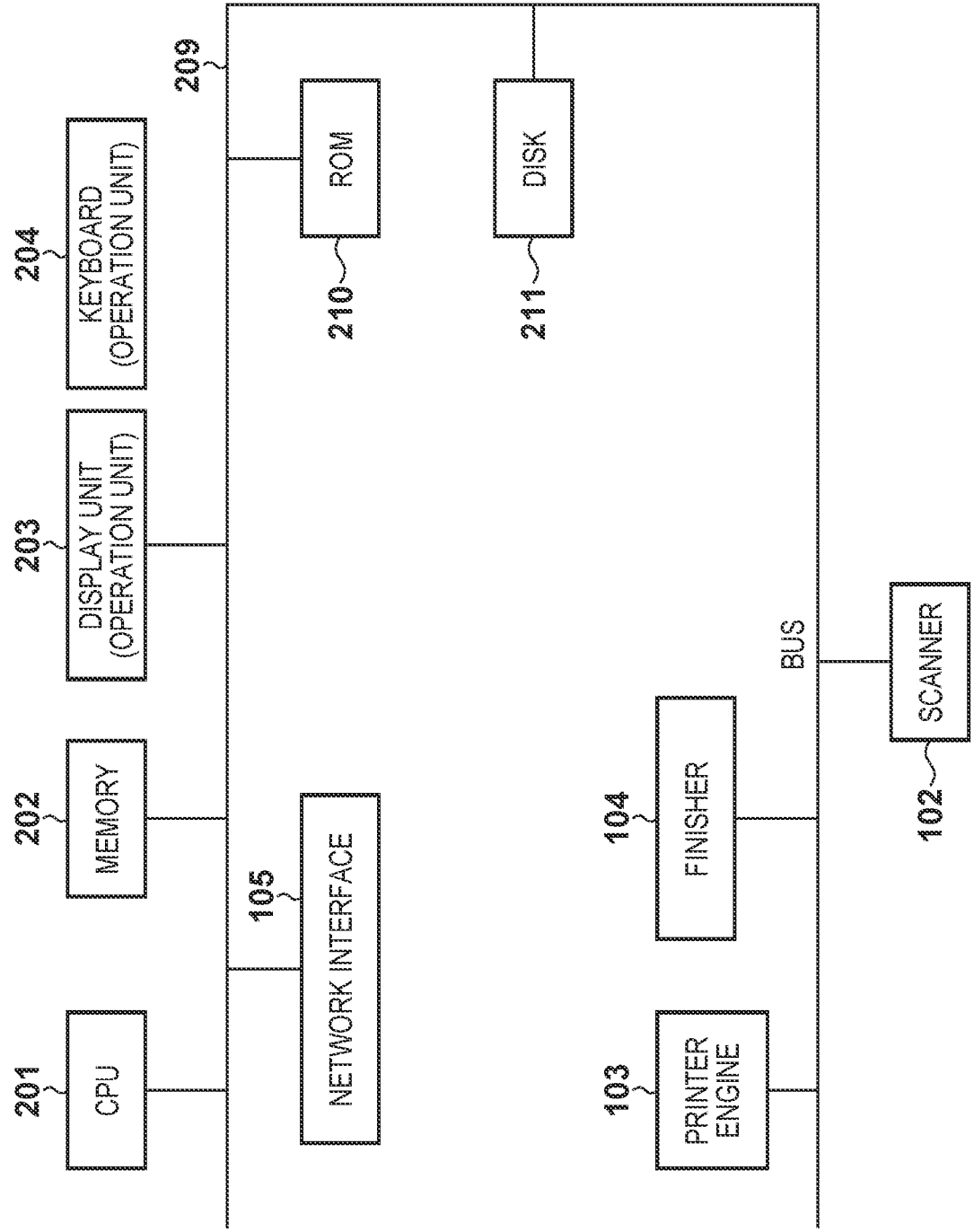
FIG. 2 is a block diagram showing the hardware arrangement of a controller according to the embodiment.

Referring to FIG. 1, a controller 101 controls the MFP, and has a hardware arrangement shown in FIG. 2. A scanner 102 is controlled by the controller 101, and scans a document to create image data of the document image. A printer engine 103 is a printer engine complying with the electrophotographic method in the embodiment. The printer engine 103 prints an image on a printing medium (sheet such as paper or envelope) under the control of the controller 101. The printer engine 103 is connectable to a finisher 104, and the finisher 104 can perform, for example, staple processing collectively for a plurality of printing media (for example, sheets) output from the printer engine 103. The controller 101 also controls the finisher 104. A network (Ethernet) interface 105 provides two-way communication with the controller 101 via itself, and can connect the MFP to a PC 107 serving as an external apparatus via a network. An operation unit 106 provides a user interface, includes a display unit and keyboard, displays information from the controller 101, and notifies the controller 101 of an instruction from the user.

FIG. 2 is a block diagram showing the hardware arrangement of the controller 101 according to the embodiment.

In the controller 101, a CPU 201 is connected to a memory 202, a display unit 203 and keyboard 204 of the operation unit 106, a ROM 210, and a storage medium (DISK) 211 via a bus 209. Various programs and data are stored in the DISK 211 such as a hard disk or flexible disk, and if necessary, sequentially read out to the memory 202 and executed by the CPU 201. The DISK 211 may be one detachable from the MFP or one incorporated in the MFP. Further, programs may be downloaded from another PC, MFP, or the like via the network and stored in the DISK 211.

The memory 202 may have both the functions of volatile and nonvolatile memories. Alternatively, the memory 202 may have the function of a volatile memory, and the DISK 211 may have the function of a nonvolatile memory. The memory 202 may be a removable memory medium.

The CPU 201 writes display data in a display memory (not shown) to present a display on the display unit 203. The CPU 201 receives data from the keyboard 204 or the display unit 203 serving as a touch panel, thereby accepting input of an instruction from the user. The input information is transferred to one of the memory 202, DISK 211, and CPU 201, accumulated, and used for various processes. The network interface 105 is connected to the bus 209, and the CPU 201 performs communication via the interface by loading or writing data via the network interface 105.

Further, the printer engine 103, finisher 104, and scanner 102 are connected to the bus 209. The CPU 201 reads and writes data from and in the printer engine 103, finisher 104, and scanner 102 to execute operations such as printing and scanning, and acquire information representing various statuses. Image data can be saved in the DISK 211 or memory 202 of the controller 101 from the scanner 102 or network interface 105. Also, image data can be accumulated in advance in a removable memory and loaded by attaching the memory to the controller 101. Image data accumulated in the DISK 211 can be moved or copied to the memory 202. Various additional images (for example, a page number) can be composited with image data in the memory 202 in accordance with contents designated from the operation unit 106. Note that the printer engine 103, finisher 104, and scanner 102 may exist not in the MFP but as single peripheral devices on the network, and may be controlled by the controller 101 of the MFP.

Figure 3:
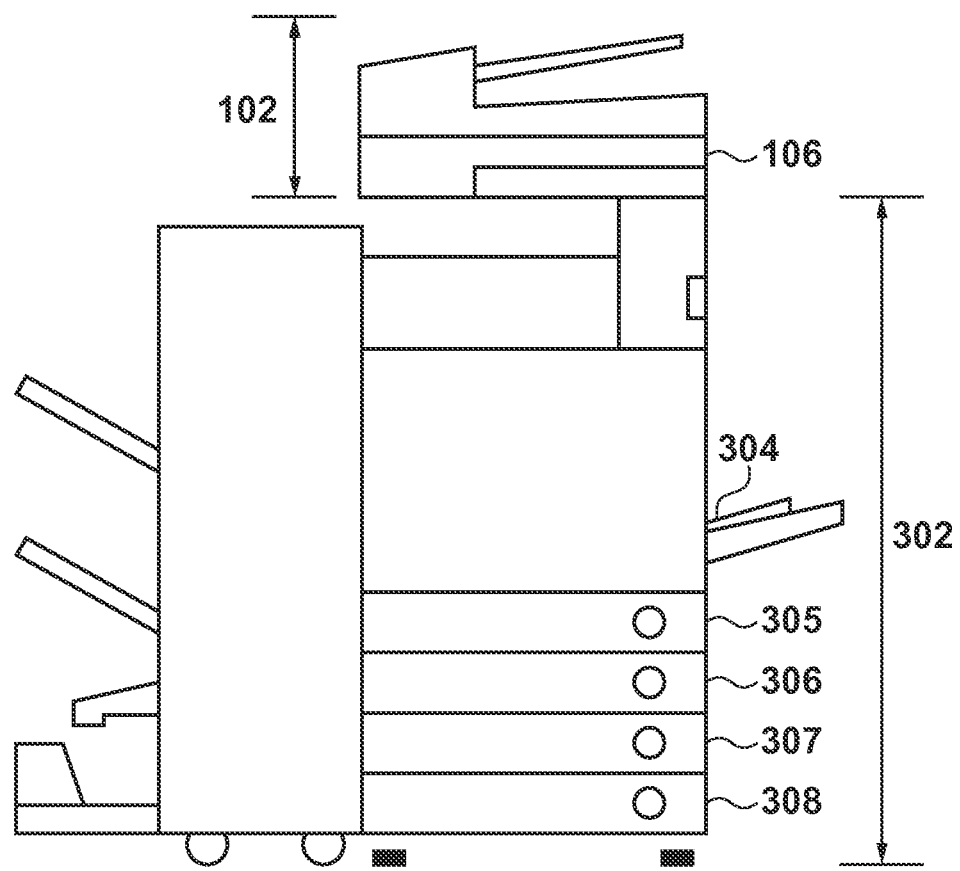
FIG. 3 is a schematic view showing the MFP according to the embodiment.

FIG. 3 is a schematic view showing the MFP according to the embodiment.

The scanner 102 serving as an image input device irradiates an image on a sheet serving as a document with light, and scans a CCD line sensor to convert the document image into electrical image data. The scanner 102 determines the color and size of the document from the electrically converted image data. A printer unit 302 (printer engine 103) serving as an image output device converts image data into an image on a sheet, prints the image on a sheet, and discharges the sheet. The print operation starts and stops in accordance with instructions from the CPU 201 of the controller 101. Reference numerals 304 to 308 denote paper feed sources. The paper feed source 304 is a manual feed tray, and the paper feed sources 305 to 308 are paper feed cassettes (paper containing units), in each of which a plurality of sheets (including envelopes) can be set. Note that the MFP can print, based on print data, an image on an envelope contained in the manual feed tray 304 or the paper feed cassette.

Figure 4:
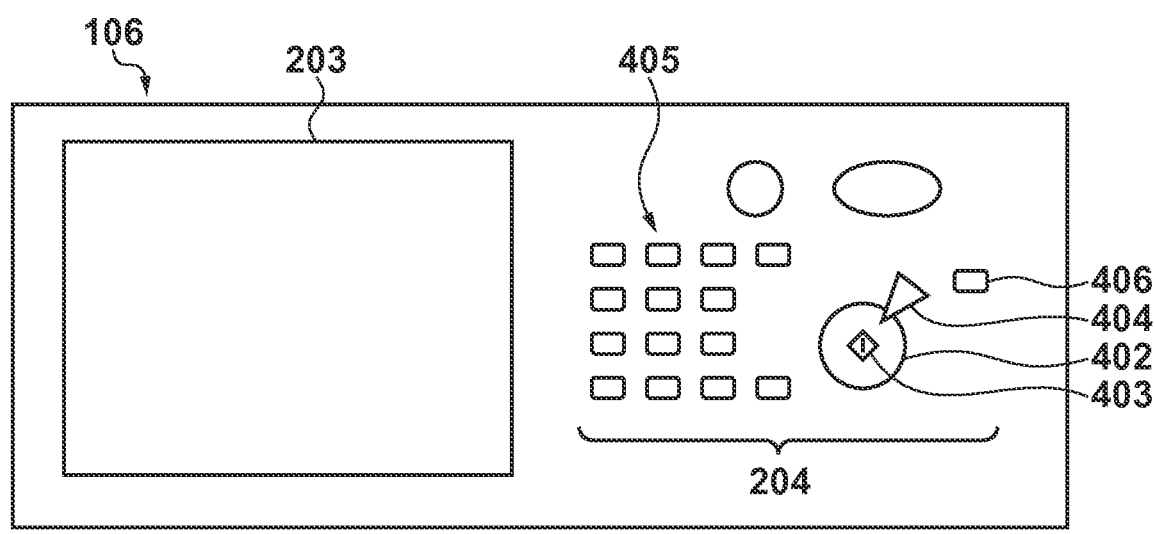
FIG. 4 is a plan view showing the operation unit of the MFP according to the embodiment.

FIG. 4 is a plan view showing the operation unit 106 of the MFP according to the embodiment.

The display unit 203 is formed from a touch panel sheet adhering to a liquid crystal display, and displays an operation screen and soft keys. When the user presses a displayed key, the display unit 203 notifies the CPU 201 of the position information.

Next, the keyboard 204 will be explained. A start key 402 is used to designate the start of a document image reading operation. An LED 403 in two, green and red colors is arranged at the center of the start key 402, and the colors represent whether the start key 402 is available. A stop key 404 is used to stop an operation in progress. A ten-key pad 405 is formed from numeric and character buttons, and used to set a copy count and designate screen switching of the display unit 203 and the like. A user mode key 406 is pressed to make settings of the MFP.

Figure 5C:
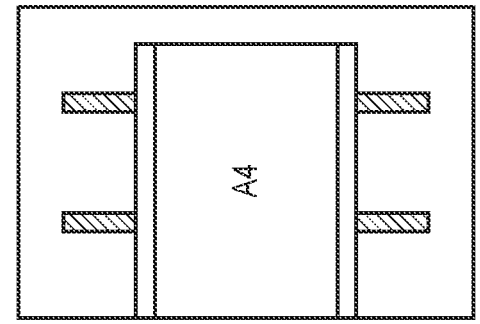
FIGS. 5A to 5C are views showing a manual feed tray when viewed from above.
Figure 5B:
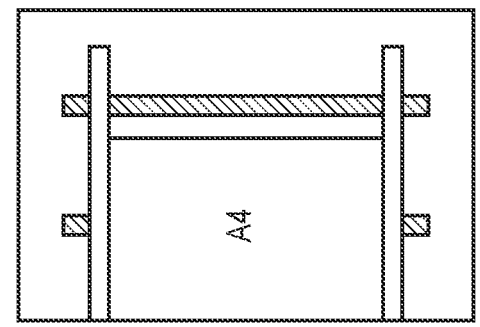
Figure 5A:
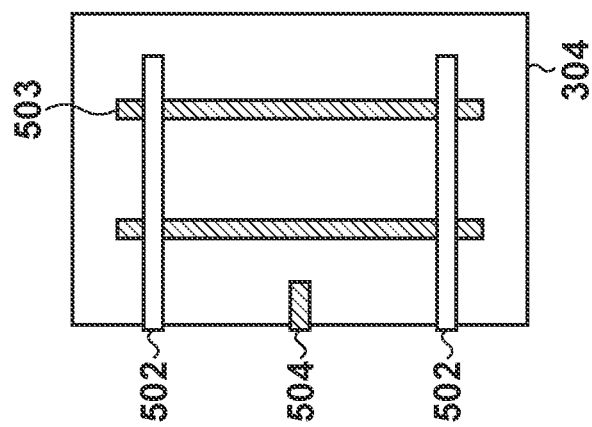

FIGS. 5A to 5C are views showing the manual feed tray 304 when viewed from above.

In FIG. 5A, the manual feed tray 304 includes guides 502 which are freely movable on rails 503. The positions of the guides 502 can be adjusted in accordance with the size of paper to be set. FIG. 5B shows guide positions when A4-size paper is set in the portrait direction. This represents a conveyance direction in long-edge feed described above. FIG. 5C shows guide positions when A4-size paper is set in the landscape direction. This represents a conveyance direction in short-edge feed described above. A sensor 504 detects that paper is placed on the manual feed tray 304. When paper is placed on the sensor 504, the controller 101 can detect, based on an output from the sensor 504, that paper is set on the manual feed tray 304.

FIGS. 6A to 8B are views each exemplifying a UI screen displayed on the display unit 203 of the operation unit 106 of the MFP according to the embodiment. A method of setting a size and paper type for a paper feed cassette from a user mode screen in FIG. 6A will be explained with reference to FIGS. 6A to 8B.

Figure 6A:
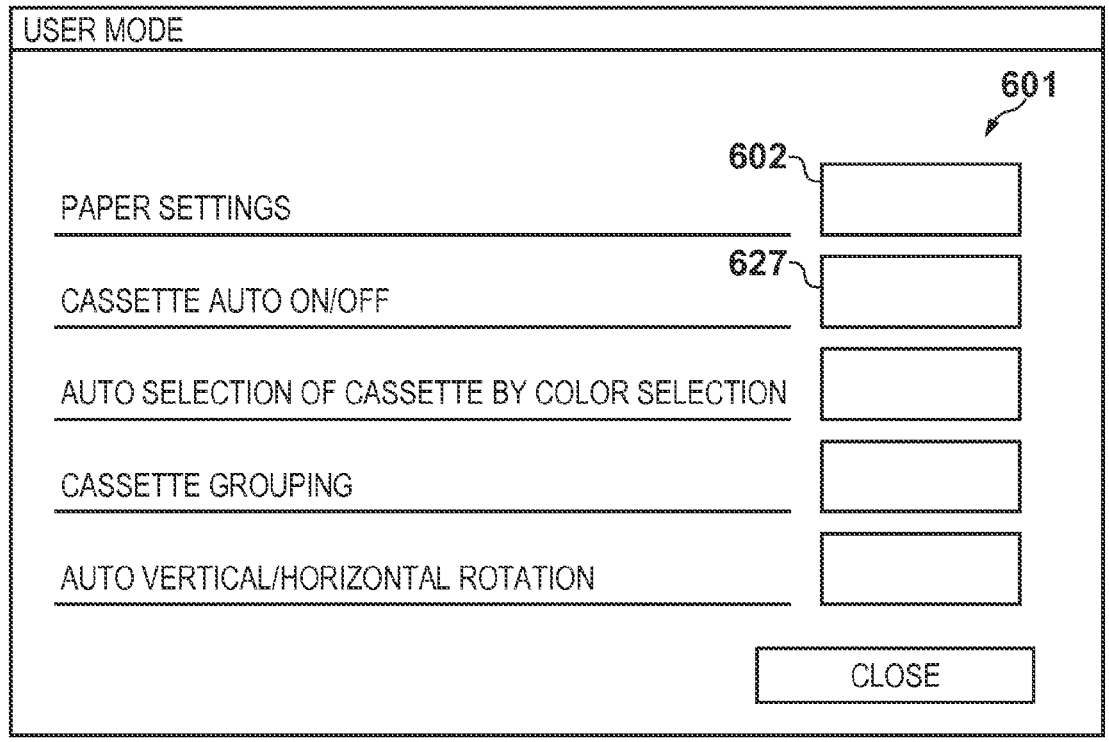
FIGS. 6A and 6B are views each showing an operation screen according to the embodiment.

When the user presses the user mode key 406 (FIG. 4) of the operation unit 106, a user mode screen in FIG. 6A appears. The user can set a paper size on this operation screen. When the user presses a paper setting button 602 in a button group 601, a screen shown in FIG. 6B for setting the size and type of paper to be set in the paper feed cassette appears.

Figure 6B:
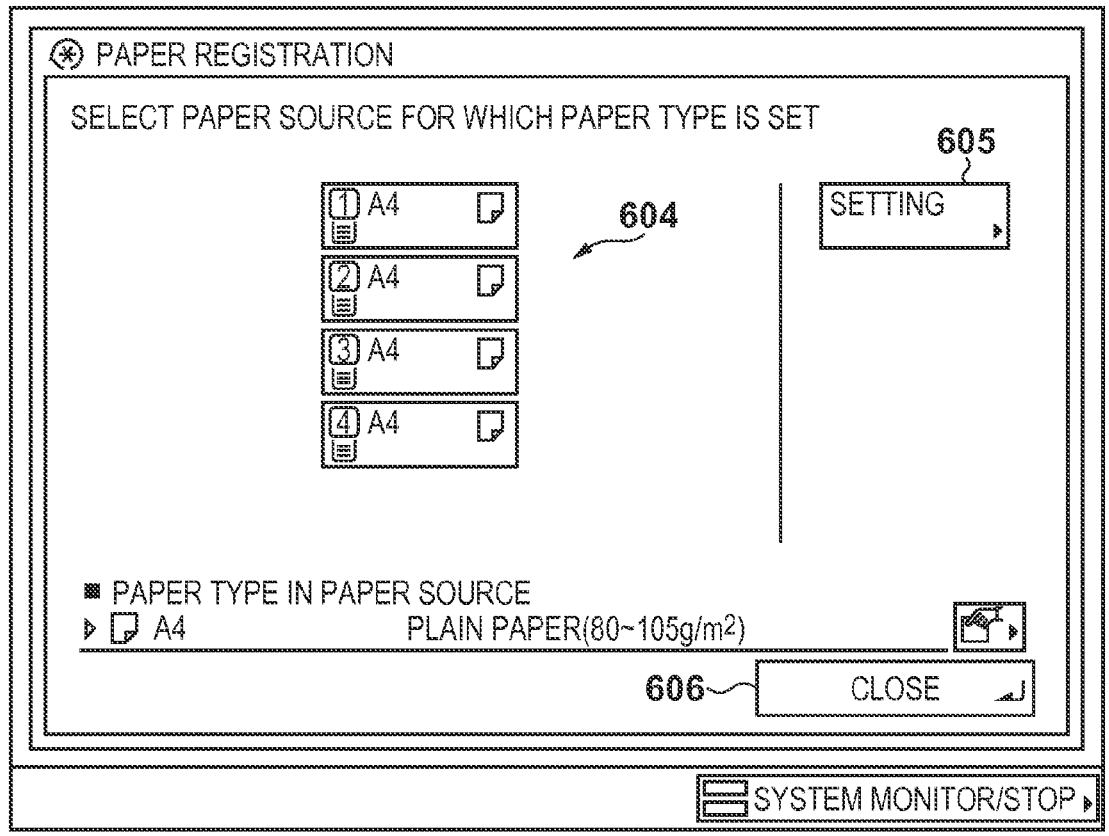

The screen in FIG. 6B provides a cassette selection button group 604. By pressing a button in the button group 604, the user can select an arbitrary paper feed cassette. When the user selects a paper feed cassette from the button group 604 and presses a set button 605, a screen shown in FIG. 7A appears.

Figure 7A:
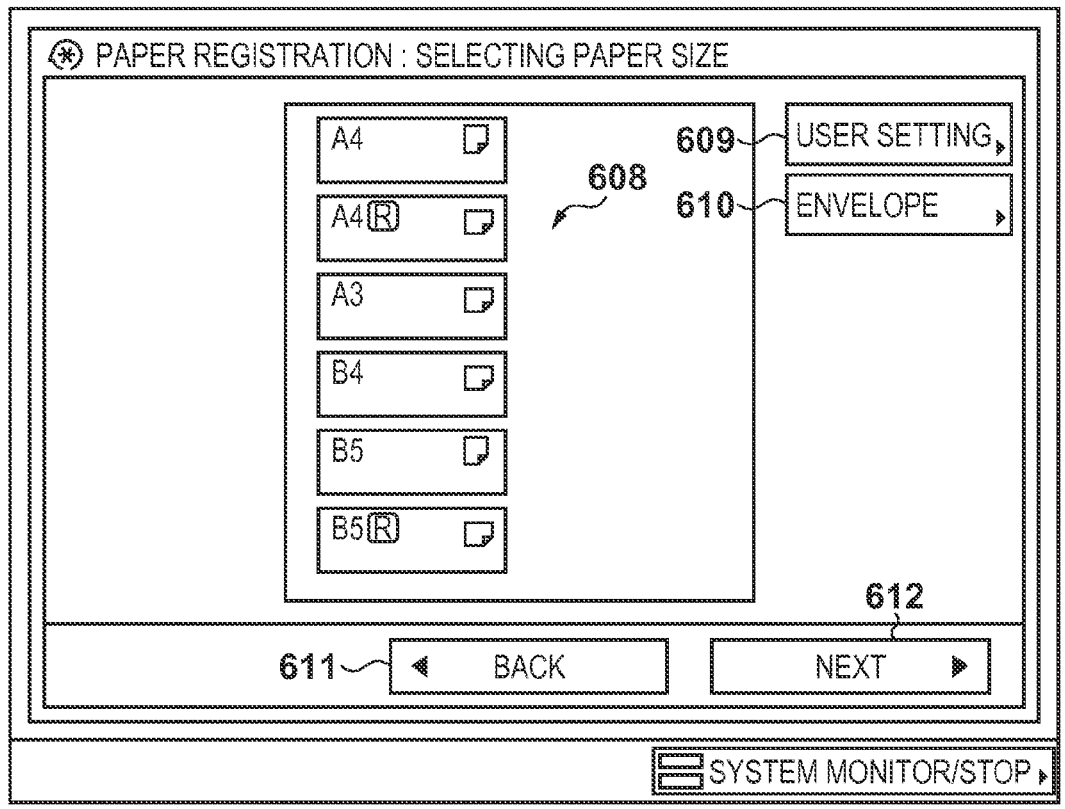
FIGS. 7A and 7B are views each showing an operation screen according to the embodiment.

The screen in FIG. 7A provides a standard-size setting button group 608. By pressing a button in the button group 608, the user can set an arbitrary standard-size for the paper feed cassette selected in FIG. 6B. The user presses a user setting button 609 to set paper of an arbitrary size. When the user presses the user setting button 609, a screen shown in FIG. 7B appears.

Figure 7B:
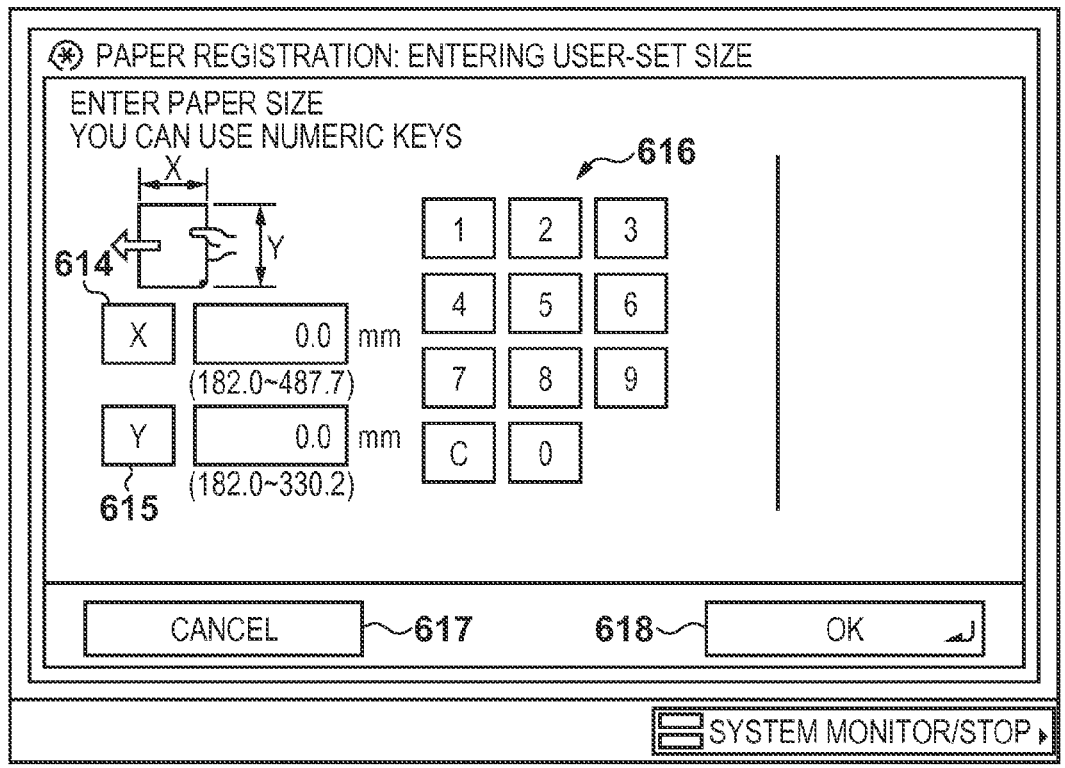

The user presses an X button 614 in FIG. 7B to set a width (dimension in the lateral direction). With a numeric button group 616, the user sets the width value. The user presses a Y button 615 to set a length (dimension in the longitudinal direction). With the numeric button group 616, the user sets the length value. The user presses a cancel button 617 to cancel settings on the screen. When the user presses the cancel button 617, the screen in FIG. 7B returns to one in FIG. 7A without any setting. The user presses an OK button 618 to end input of dimensions in the longitudinal and lateral directions, and set these values. When the user presses the OK button 618, the screen in FIG. 7B returns to one in FIG. 7A.

The user presses an envelope button 610 in FIG. 7A to set an envelope size. When the user presses the envelope button 610, a screen in FIG. 8A appears. The screen in FIG. 8A provides an envelope size setting button group 620. By pressing a button in the button group 620, the user can set the standard-size of an envelope (first setting). A button corresponding to "end-opening envelope (long format) 3" is selected as a default. The default changes depending on the destination ("destination" is information indicating a country or region where a device is installed, and is saved in either the memory 202 or DISK 211 of the controller 101). The default is "end-opening envelope (long format) 3" for Japan and "Com10" for overseas. The user presses a cancel button 621 to cancel settings on the screen. When the user presses the cancel button 621, the screen in FIG. 8A returns to one in FIG. 7A without any setting. The user presses an OK button 622 to decide an envelope size. When the user presses the OK button 622, an envelope size is set, and the screen in FIG. 8A returns to one in FIG. 7A.

When the user sets a standard-size or user-set size as the envelope size and then presses a "Next" button 612 in FIG. 7A, a screen in FIG. 8B appears. This screen provides a paper type setting button group 624. By pressing a button in the button group 624, the user can set a paper type. The user presses a cancel button 625 to cancel settings on the screen.

When the user presses the cancel button 625, the screen in FIG. 8B returns to one in FIG. 7A without any setting. The user presses an OK button 626 to decide a paper type. When the user presses the OK button 626, a paper type is set, and the screen in FIG. 8B returns to one in FIG. 6B. Further, when the user wants to set another paper feed tray, he selects a paper feed cassette again from the cassette selection button group 604, and repeats setting processing. If no more setting is made, the user presses a close button 606, and then the screen returns to one in FIG. 6A.

Table 1 below exemplifies information set for each paper feed cassette according to the embodiment. After the end of paper setting processing, data for one of cassette 1 to cassette 4 in Table 1 is updated. The data can be saved in either the memory 202 or DISK 211 of the controller 101.

TABLE 1

| Cassette Source | Paper Size | X Size | Y Size | Paper Type |
|---|---|---|---|---|
| Cassette 1 | A4 | — | — | Plain paper |
| Cassette 2 | End-opening envelope (long format) 3 | — | — | Thick paper |
| Cassette 3 | User setting | 200 mm | 297 mm | Plain paper |
| Cassette 4 | B4 | — | — | Plain paper |
| Manual Feed | Unset | — | — | Unset |

Next, a method of setting the size and type of paper when paper is set on the manual feed tray 304 will be explained. When the user sets paper on the manual feed tray 304 and sets a state as shown in FIG. 5B or 5C, the sensor 504 detects this and the printer engine 103 notifies the controller 101 that paper has been set. Upon receiving this notification, the controller 101 displays the screen shown in FIG. 7A on the display unit 203 of the operation unit 106. In this case, a Back button 611 is hidden. As described above, when the user sets a standard-size or user-set size as the envelope size on this screen and then presses the "Next" button 612, the screen in FIG. 8B appears. As described above, this screen provides the paper type setting button group 624. The user can set a paper type by pressing a button in the paper type setting button group 624, or return the screen in FIG. 8B to one in FIG. 7A by pressing the cancel button 625. When the user presses the OK button 626 after the end of setting, the paper registration screen disappears, and the size and paper type in "Manual Feed" of Table 1 are updated from "unset" to an actually set size and type. When the manual feed tray 304 runs out of sheets, the sensor 504 detects this and the printer engine 103 notifies the controller 101 that sheets have run out. Upon receiving this notification, the controller 101 updates each item in "Manual Feed" of Table 1 to "unset".

When sheets are set again on the manual feed tray 304, the above-described sequence is repeated. The user often sets sheets on the manual feed tray 304 to finish them up for one copy job. Thus, when the absence of sheets set on the manual feed tray 304 is detected, the settings of the manual feed tray 304 are cleared. This can prevent printing of an image on sheets newly set on the manual feed tray 304 at settings for previous sheets.

FIG. 9 is a view for explaining the structure of the scanner 102.

Information on a document 703 is read while the document 703 is moved relative to an exposure unit 713 of a document reading device 719. The document 703 is set on a document tray 702. A document feed roller 704 is paired with a separation pad 705, and conveys the documents 703 one by one. The conveyed document 703 is sent into the scanner by intermediate rollers 706, conveyed by a large roller 708 and first driven roller 709, and further conveyed by the large roller 708 and a second driven roller 710. The document 703 conveyed by the large roller 708 and second driven roller 710 passes between a sheet-fed document glass 712 and a document guide plate 717, and conveyed by the large roller 708 and a third driven roller 711 via a jump table 718. The document 703 conveyed by the large roller 708 and third driven roller 711 is discharged by a pair of document discharge rollers 707. Note that the document 703 is conveyed between the sheet-fed document glass 712 and the document guide plate 717 to contact the sheet-fed document glass 712 by the document guide plate 717.

When the document 703 passes on the sheet-fed document glass 712, the exposure unit 713 exposes a surface of the document 703 that contacts the sheet-fed document glass 712. The light reflected by the document 703 travels to a mirror unit 714. The traveling reflected light is condensed through a lens 715, and converted into an electrical signal by a CCD sensor 716. The electrical signal is transferred to the controller 101.

Figure 10:
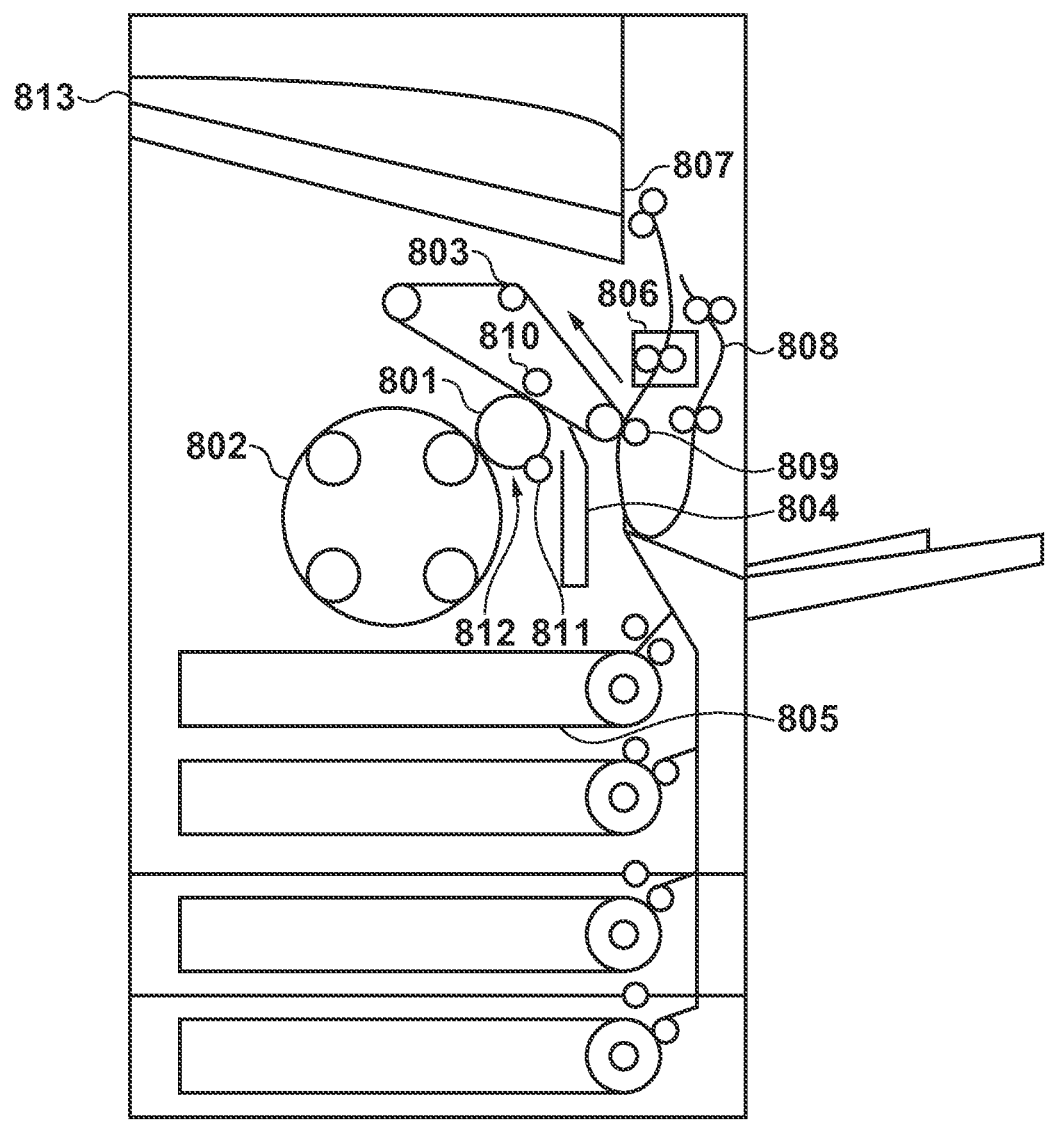
FIG. 10 is a view for explaining the arrangement of a printer unit.

FIG. 10 is a view for explaining the arrangement of the printer unit 302.

FIG. 10 exemplifies a full-color printing apparatus. A primary charger 811 charges a photosensitive drum 801 to a potential of a specific polarity, and an exposure unit (not shown) exposes a position indicated by an arrow 812 in accordance with an instruction from the controller 101. As a result, an electrostatic latent image corresponding to the first color component is formed. After that, the electrostatic latent image is developed using one of four developing units of a developing device 802. An intermediate transfer belt 803 is driven to be conveyed in a direction indicated by an arrow. When the image of the first color component formed on the photosensitive drum 801 passes through a contact portion between the photosensitive drum 801 and the intermediate transfer belt 803, it is transferred onto the intermediate transfer belt 803 by an electric field formed by a primary transfer roller 810. A cleaning device 804 cleans the surface of the photosensitive drum 801 after the end of transfer onto the intermediate transfer belt 803. This processing is sequentially repeated to transfer images of four colors onto the intermediate transfer belt 803 and superimpose them on each other, thereby forming a color image. When an image of a single color is formed, transfer processing is performed only once. The image transferred onto the intermediate transfer belt 803 is printed onto paper fed from a paper feed cassette 805 by a secondary transfer roller 809. A fixing unit 806 heats the paper and fixes the image printed on it. The paper after fixing passes through conveyance rollers, is discharged outside the apparatus from a discharge port 807, and stacked on a discharge tray 813.

Figure 11:
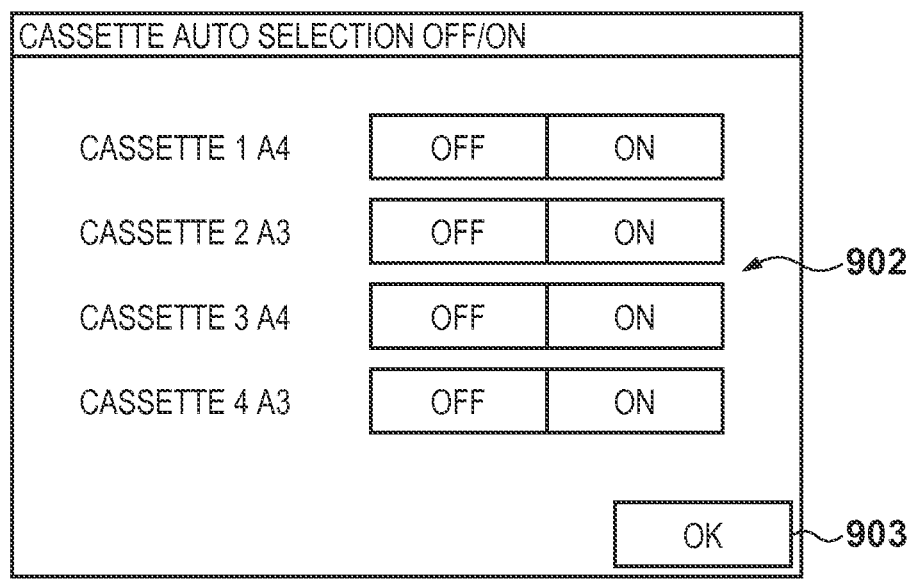
FIG. 11 is a view exemplifying a UI screen for selecting a paper feed cassette subjected to auto paper selection.

FIG. 11 is a view exemplifying a UI screen for selecting a paper feed cassette subjected to auto paper selection. Auto paper selection is processing of automatically selecting a paper feed source serving as the source of paper to be used in printing from a plurality of paper feed sources by the CPU 201 in accordance with the document size and user settings.

When the user presses the user mode key 406 of the operation unit 106, the user mode screen in FIG. 6A appears. When the user presses a button 627 corresponding to a cassette auto ON/OFF setting in the button group 601, the screen shown in FIG. 11 appears. This screen displays equipped paper feed cassettes and the size of paper set in each paper feed cassette. With a selection button group 902, the user can designate whether or not to set the paper feed cassette as a cassette to be selected automatically. A cassette source for which "ON" is pressed becomes a cassette subjected to auto paper selection. A cassette for which "OFF" is pressed becomes a cassette not subjected to auto paper selection. When the user presses an OK button 903, setting ends, and the screen in FIG. 11 returns to one in FIG. 6A.

Table 2 below exemplifies data representing auto paper selection of paper feed cassettes and a manual feed tray according to the embodiment.

After the end of cassette auto ON/OFF setting processing, data for one of cassette 1 to cassette 4 and the manual feed tray in Table 2 is updated in correspondence with the setting. The data can be saved in either the memory 202 or DISK 211 of the controller 101. This data is used when automatically selecting a cassette. In the example of Table 2, it is set to use all cassettes 1 to 4 in auto paper switching and not to use only the manual feed tray in auto paper switching.

TABLE 2

| Cassette | State |
| --- | --- |
| Cassette 1 | ON |
| Cassette 2 | ON |
| Cassette 3 | ON |
| Cassette 4 | ON |
| Manual Feed | OFF |

Figure 12:
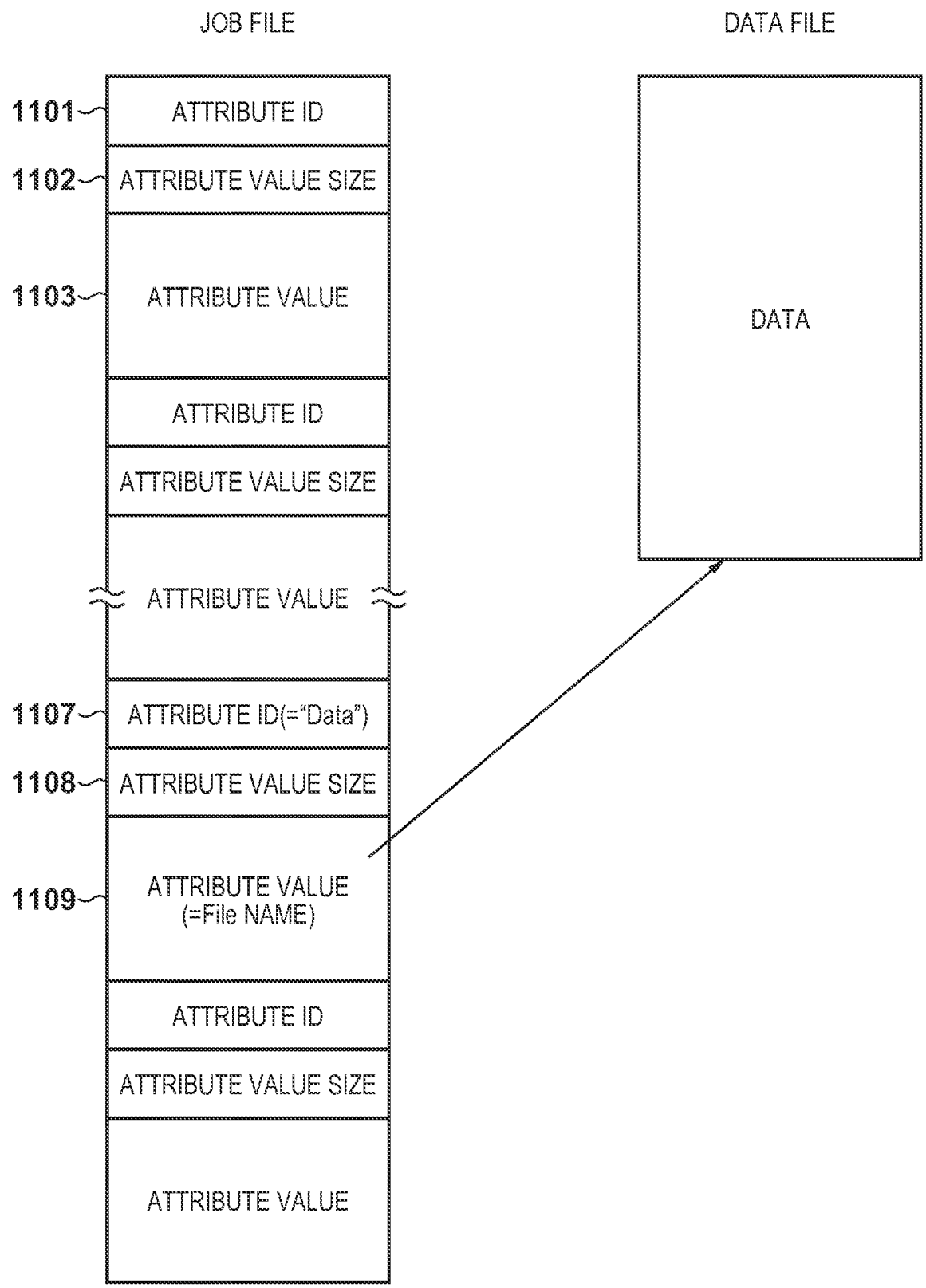
FIG. 12 is a view for explaining the data structure of a print job in the embodiment.

FIG. 12 is a view for explaining the data structure of a print job in the embodiment. An application in the device generates this data upon receiving an instruction to execute a print job.

The entity of the job is represented by successively arranging a plurality of sets each of an attribute ID 1101, attribute value size 1102, and attribute value 1103. When a job contains data, it holds a value representing data as an attribute ID, the size of a file name as an attribute value size, and the file name of a file holding document data as an attribute value, as represented by 1107, 1108, and 1109. Each attribute value contains a data format (for example, PDL used), copy count, cassette source, paper size used in printing, and designation of finishing processing.

FIG. 13 is a table exemplifying attributes according to the embodiment.

An attribute ID 1301 represents the identification number (ID) of an attribute. A type ID 1302 represents the type (size) of an ID, which is set in advance such that "1" is an undefined length and "2" is 1 byte. A value 1303 represents a possible value and has a meaning as represented by a meaning 1304. The attributes shown in FIG. 13 are merely examples, and there are various other attributes. A job is formed by setting these values in the attribute ID, attribute size, and attribute value of a job shown in FIG. 12.

Figure 14:
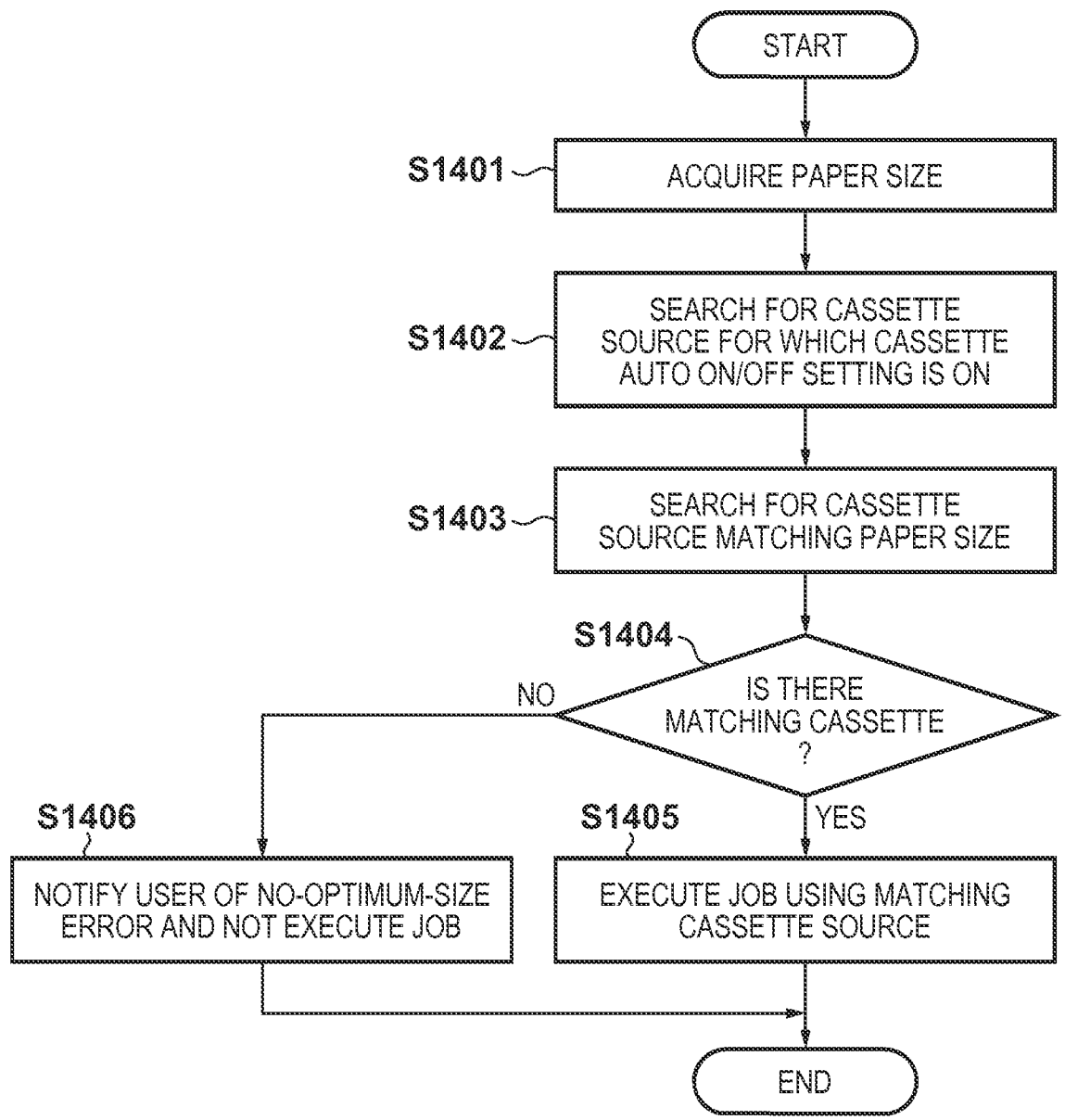
FIG. 14 is a flowchart showing an operation of automatically switching a cassette source in the MFP according to the embodiment when sheets run out during printing by a print job for which a paper size is designated.

FIG. 14 is a flowchart showing an operation of automatically switching a cassette source in the MFP according to the embodiment when sheets run out during printing by a print job for which a paper size is designated. Note that a program for executing this processing is stored in the ROM 210 or DISK 211, loaded in the memory 202 in execution, and executed under the control of the CPU 201.

When auto cassette switching processing starts after a job is interrupted due to the absence of sheets, the CPU 201 acquires a paper size requested for processing from an attribute designated by the job in step S1401. The process then advances to step S1402, and the CPU 201 searches for a cassette whose state is set to ON in Table 2. The process then advances to step S1403, and the CPU 201 compares the paper size acquired in step S1401 with the paper sizes of respective cassettes whose states are ON in step S1402, and determines whether there is a cassette matching the paper size. For example, when the paper size acquired in step S1401 is B4, it is detected that B4-size sheets are set in 4 out of target cassettes 1 to 4 (see Table 1). If all cassette auto ON/OFF settings are "OFF" in Table 2 or a cassette containing B4-size sheets does not exist in Table 1, there is no matching cassette.

In step S1404, the CPU 201 determines whether there is a matching cassette. If there is a matching cassette, the process advances to step S1405, and the CPU 201 restarts the job by using the cassette source matching the size. If the CPU 201 determines in step S1404 that there is no matching cassette, the process advances to step S1406, and the CPU 201 notifies the user that there is no usable size, and keeps interrupting the job.

Table 3 below shows an example of data when envelope sizes and flap sizes (additional sizes) attached to the envelope sizes are set for cassette 1 to cassette 4 and the manual feed tray 304. In this case, envelope sizes and flap sizes can be set for paper feed sources, that is, a plurality of cassette sources and the manual feed trays. In shipment from the factory, the flap size for each envelope size is initialized to 0.0 mm. After the end of envelope setting processing, a corresponding flap size in Table 3 is updated. The data is saved in the memory 202 or DISK 211 of the controller 101 in a nonvolatile manner.

TABLE 3

| Envelope Size | Flap Size |
| --- | --- |
| 1: COM10 | 0.0 mm |
| 2: Monarch | 0.0 mm |
| 3: ISO-C5 | 0.0 mm |
| 4: End-opening Envelope (Long Format) 3 | 0.0 mm |
| 5: Side-opening Envelope 3 | 0.0 mm |
| 6: End-opening Envelope (Square Format) 2 | 0.0 mm |

An envelope size setting method according to the embodiment will be explained with reference to FIGS. 15A, 15B, and 16.

When paper is set on the manual feed tray 304, the operation unit 106 displays the screen in FIG. 7A. If the user presses the envelope button 610 on this screen, a screen in FIG. 15A appears. The screen provides an envelope size setting button group 1402. By pressing a button in the button group 1402, the user can set an envelope size. With the button, end-opening envelope (long format) 3 is selected as a default. When the user presses a "longitudinal feed" button 1403 in the screen, the screen changes to a setting screen shown in FIG. 15B for longitudinal feed in which an envelope is printed with its short edge set parallel to the main-scanning direction. Similarly, when the user presses a "lateral feed" button 1408 in the screen of FIG. 15B, the screen changes to a lateral feed setting screen shown in FIG. 15A. The screens in FIGS. 15A and 15B include the envelope size setting button group 1402 and an envelope size setting button group 1407, respectively. By pressing a button in these button groups, the user can set an envelope size. The user presses a cancel button 1404 or 1409 to cancel settings on the screen. When the user presses the cancel button 1404 or 1409, the setting screen returns to the screen in FIG. 7A without any setting on the setting screen.

Figure 15A:
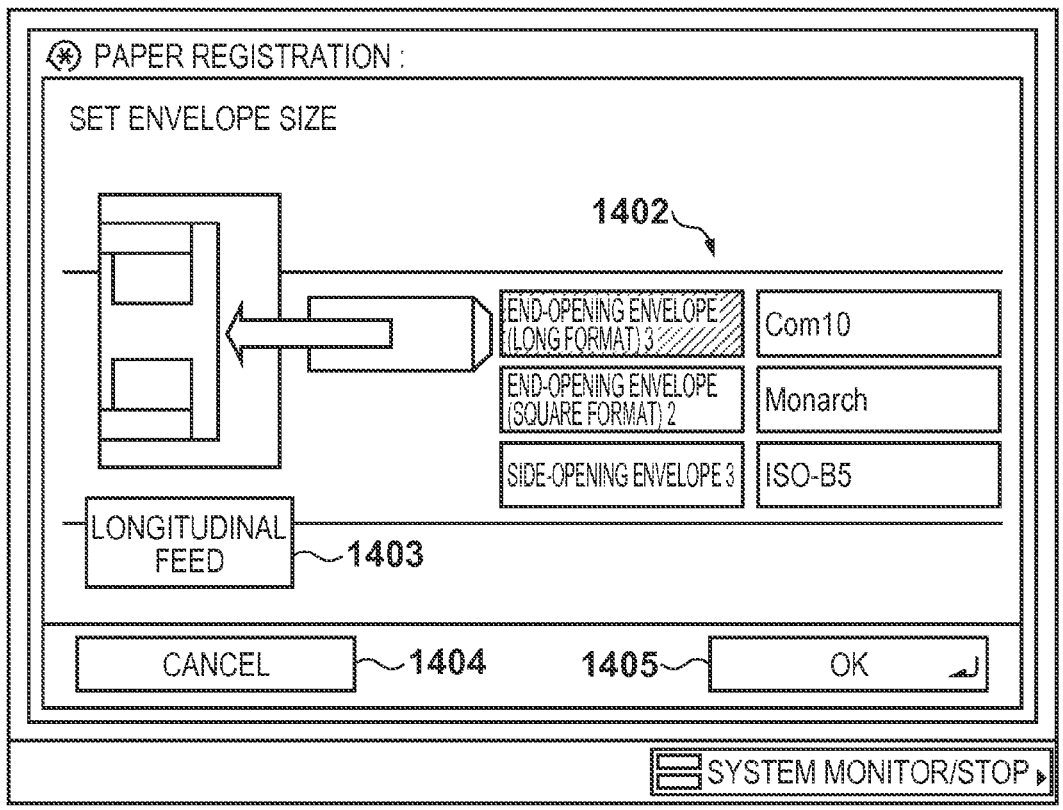
FIGS. 15A and 15B are views for explaining an envelope size setting method according to the embodiment.
Figure 15B:
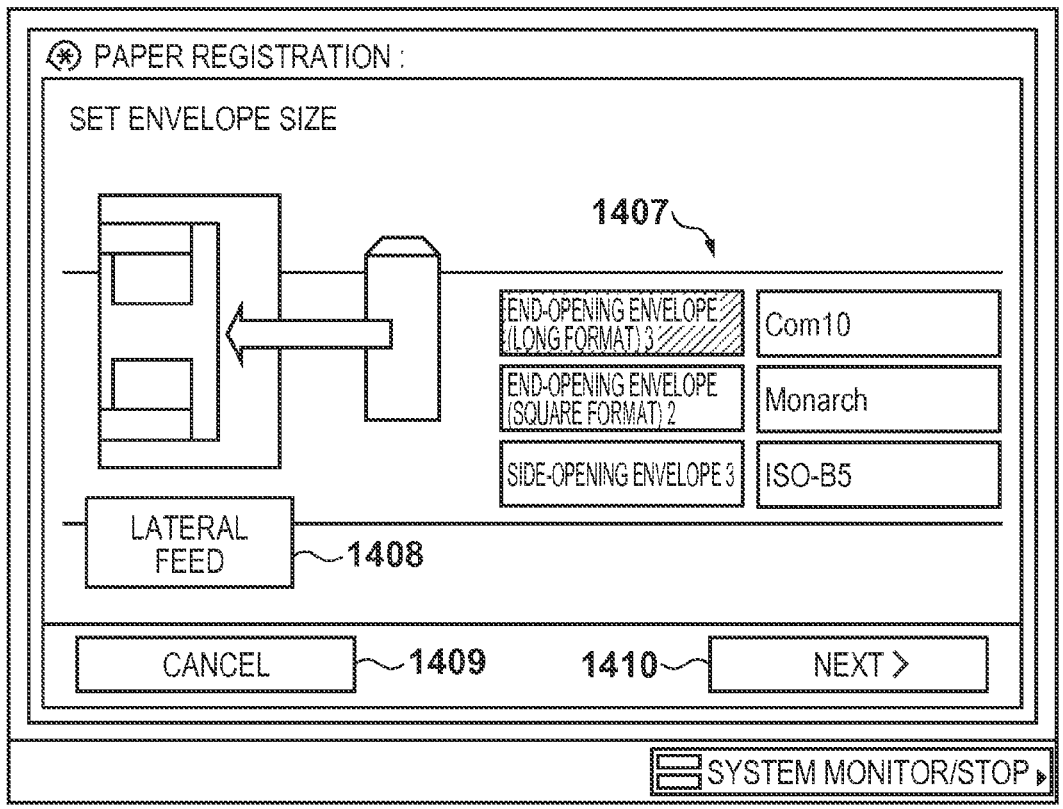

When the user presses an OK button 1405 in the envelope lateral feed screen of FIG. 15A, setting of an envelope paper size is executed and the screen disappears. The envelope longitudinal feed screen in FIG. 15B displays not the OK button but a "Next" button 1410. When the user presses the "Next" button 1410, the screen changes to a flap size setting screen in FIG. 16 (second setting).

This screen includes a numeric value input area 1413 for setting a flap size. By using a numeric key group 1412, the user can enter a flap size setting value to the numeric value input area 1413. As a value in the numeric value input area 1413 in the flap size setting screen, a flap size which has been set for the selected envelope size is acquired from a memory having the data structure shown in Table 3, and displayed. Hence, a flap size which has been set previously in association with the envelope size is displayed. The user presses a cancel button 1414 to cancel settings on the screen. When the user presses the cancel button 1414, the screen in FIG. 16 returns to one in FIG. 15B.

Figure 16:
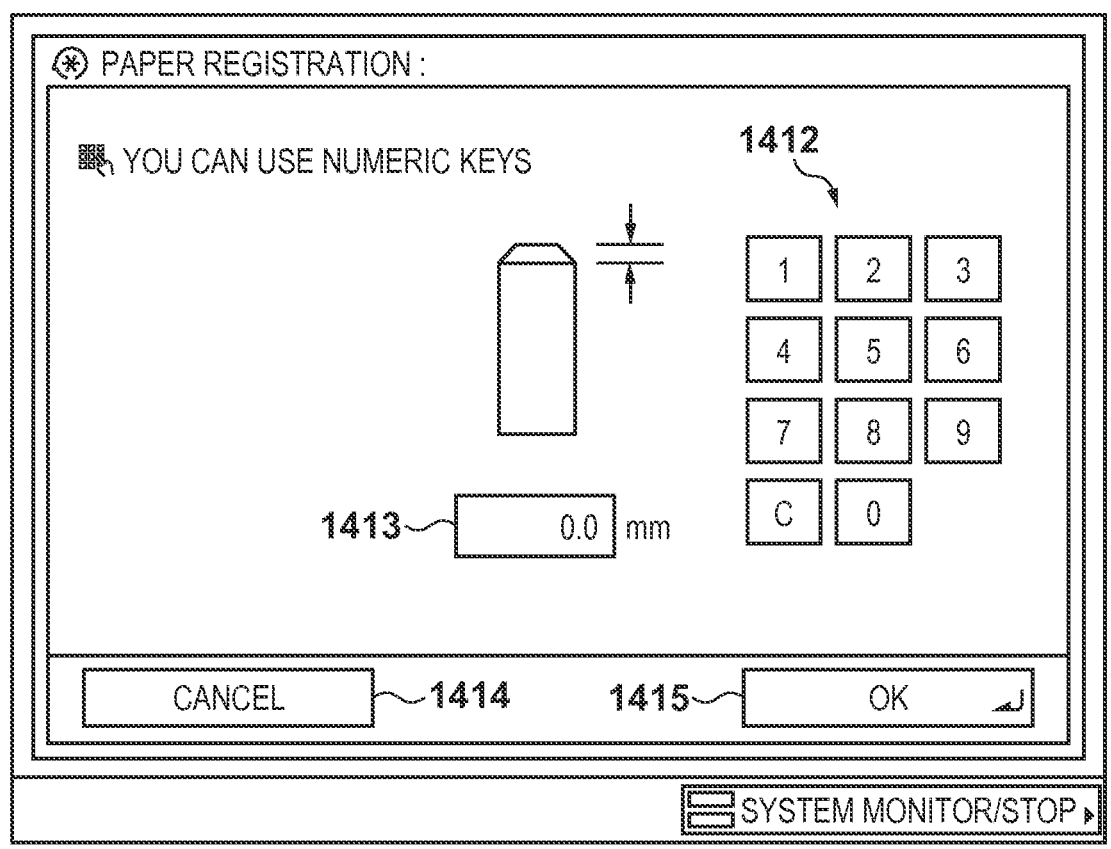
FIG. 16 is a view exemplifying a flap size setting screen.

When the user presses an OK button 1415 in FIG. 16, a flap size set using the numeric key group 1412 is set and the screen disappears. For example, when an envelope of end-opening envelope (long format) 3 in lateral feed with a flap size of 30.0 mm is set on the manual feed tray 304, the items of "Manual Feed" in data having the data structure shown in Table 1 are updated as shown in Table 4 below. The entered flap size is stored in the memory 202 in a nonvolatile manner in association with the envelope size set in FIG. 15B.

TABLE 4

| Cassette Source | Paper Size | X Size | Y Size | Paper Type |
| --- | --- | --- | --- | --- |
| Manual Feed | End-opening envelope (long format) 3 | — | — | Envelope |

| Envelope Size | Flap Size |
| --- | --- |
| 1: COM10 | 0.0 mm |
| 2: Monarch | 0.0 mm |
| 3: ISO-C5 | 0.0 mm |
| 4: End-opening Envelope (Long Format) 3 | 30.0 mm |
| 5: Side-opening Envelope 3 | 0.0 mm |
| 6: End-opening Envelope (Square Format) 2 | 0.0 mm |

In this state, when printing is executed to use envelopes set on the manual feed tray 304, and the manual feed tray 304 runs out of them, the sensor 504 detects this, as described above. Upon receiving the notification from the sensor 504, the controller 101 resets the settings of "Manual Feed". Therefore, the set values of "Manual Feed" shown in Table 1 are reset to the "unset" state in Table 5 below. At this time, data in the memory 202 which stores the flap size in association with the envelope size is not updated.

TABLE 5

| Cassette Source | Paper Size | X Size | Y Size | Paper Type |
| --- | --- | --- | --- | --- |
| Manual Feed | Unset | — | — | Unset |

| Envelope Size | Flap Size |
| --- | --- |
| 1: COM10 | 0.0 mm |
| 2: Monarch | 0.0 mm |
| 3: ISO-C5 | 0.0 mm |
| 4: End-opening Envelope (Long Format) 3 | 30.0 mm |
| 5: Side-opening Envelope 3 | 0.0 mm |
| 6: End-opening Envelope (Square Format) 2 | 0.0 mm |

If envelopes are set again on the manual feed tray 304, the sensor 504 detects this and the controller 101 displays the screen of FIG. 7A on the display unit of the operation unit 106. When the user selects the envelope in the screen of the FIG. 7A, the screen changes to one in FIG. 15A. When the user selects the "longitudinal feed" 1403 and selects an envelope size (end-opening envelope (long format) 3), the screen changes to the flap size setting screen in FIG. 16. As described above, a previously set value is displayed in the flap size input area 1413. If the flap size remains unchanged to, for example, continuously use identical envelopes, the flap size can be set by only pressing the OK button 1415 without entering again the frap size using the numeric key group 1412.

Figure 17A:
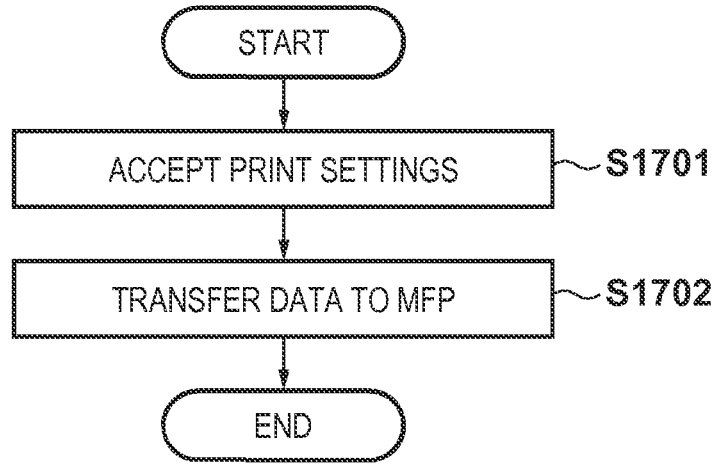
FIGS. 17A and 17B are flowcharts for explaining a printing sequence of PDL data on an envelope by a print job according to the embodiment.
Figure 17B:
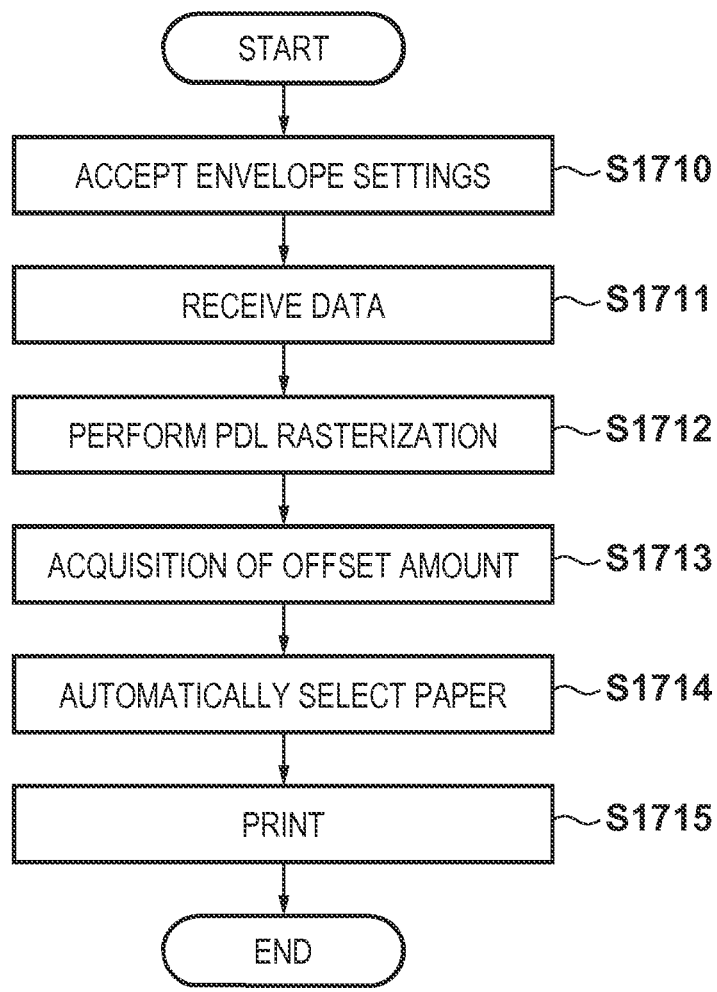

FIGS. 17A and 17B are flowcharts for explaining a printing sequence of PDL data on an envelope by a print job according to the embodiment. FIG. 17A shows processing by the PC 107, and FIG. 17B shows processing by the MFP according to the embodiment. Note that the processing shown in the flowchart of FIG. 17A is implemented by reading out a program stored in the ROM (not shown) of the PC 107 and executing it by the CPU (not shown) of the PC 107. Also, the processing shown in the flowchart of FIG. 17B is implemented by reading out a program stored in the ROM 210 and executing it by the CPU 201.

First, in step S1701 of FIG. 17A, the PC 107 accepts the print settings of a PDL image output job from the user. The print setting contents include the copy count, paper size (envelope size in printing on an envelope), single-sided/double-sided, page output order, sort output, and stapling/no-stapling. Then, the process advances to step S1702, and the PC 107 accepts a print instruction from the user, and converts code data to be printed into so-called PDL data (print data) by using driver software installed in the PC 107. The PC 107 transfers the PDL data to the controller 101 via the network interface 105 together with the print setting parameters set in step S1701.

Next, processing by the MFP will be explained with reference to FIG. 17B.

Figure 18A:
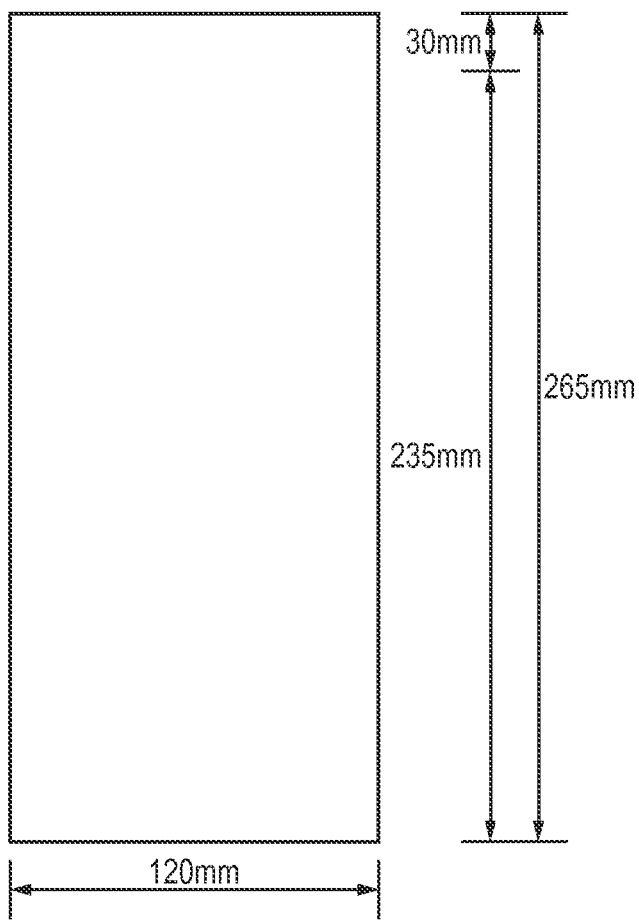
FIGS. 18A and 18B are views for explaining an envelope size of end-opening envelope (long format) 3.
Figure 18B:
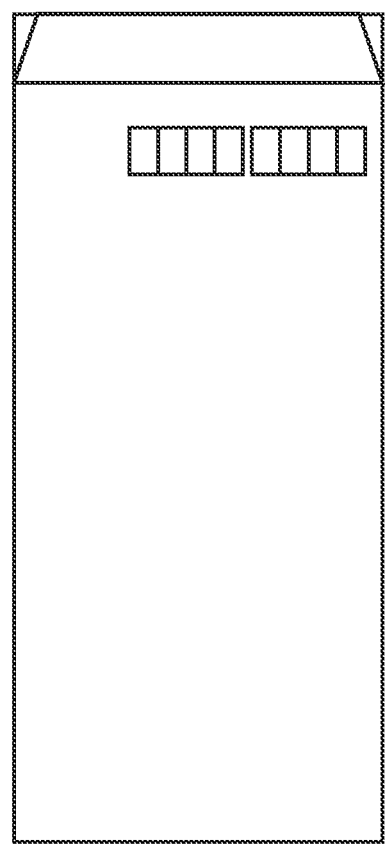

In step S1710, the CPU 201 detects that, for example, an envelope of end-opening envelope (long format) 3 in FIG. 18B is set on the manual feed tray 304. The user selects the "longitudinal feed" 1403 in FIG. 15A, and sets "end-opening envelope (long format) 3" as the envelope size in FIG. 15B. Further, the user enters, for example, "30.0" mm as the flap size and presses the OK button 1415 in FIG. 16. Then, the items of "Manual Feed" in Table 1 are updated as shown in Table 4. More specifically, in "Manual Feed", "end-opening envelope (long format) 3" is set as the paper size and "envelope" is set as the paper type. Also, the flap size of the envelope size "end-opening envelope (long format) 3" is updated to 30.0 mm.

In step S1711, the CPU 201 receives the PDL data transferred from the PC 107 via the network interface 105. The process advances to step S1712, and the CPU 201 rasterizes the PDL data into image data based on the print setting parameters. Rasterization into image data is executed in the memory 202.

Figure 19:
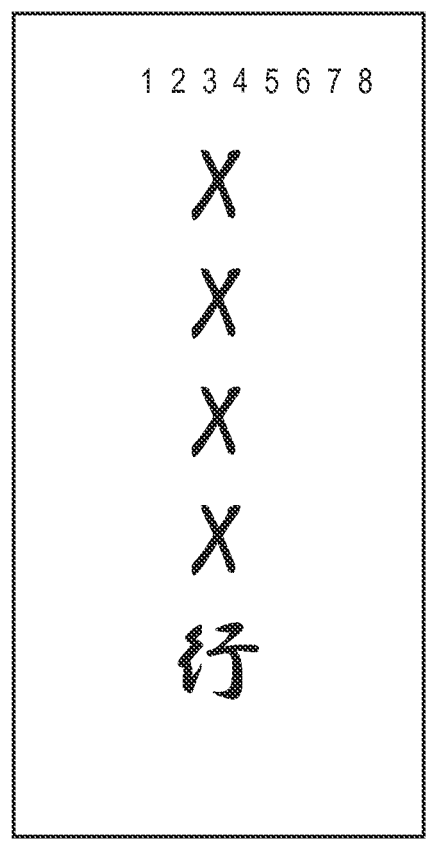
FIG. 19 is a view showing an image of image data rasterized in a memory when end-opening envelope (long format) 3 is set as the image size.

FIG. 19 is a view showing an image of image data rasterized in the memory when end-opening envelope (long format) 3 is set as the image size.

End-opening envelope (long format) 3 is defined by a size of 120 mm×235 mm. Image data of a size corresponding to this size is rasterized in the memory 202.

After that, the process advances to step S1713, and the CPU 201 acquires an offset amount based on the paper size (envelope size) designated by the PDL job. At this time, the CPU 201 acquires the paper size designated by the PDL job, and determines whether the acquired size coincides with the envelope size managed in Table 3. If there is a coincident size, the CPU 201 acquires the flap size and sets it as an offset amount.

The process advances to step S1714, and the CPU 201 selects a paper feed source matching the acquired paper size. Since the designated paper size is end-opening envelope (long format) 3, the CPU 201 selects a paper feed source (manual feed tray in this case) in which an envelope of end-opening envelope (long format) 3 is set, and acquires a paper feed direction set for the paper feed source.

Figure 20C:
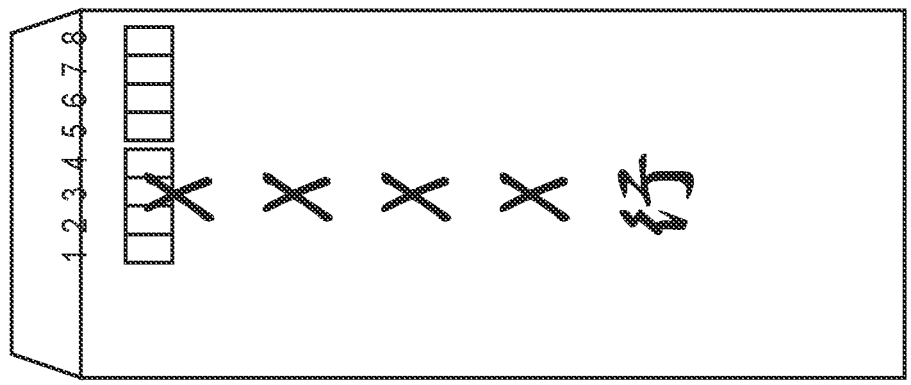
FIGS. 20A to 20C are views each showing a printing result on an envelope.
Figure 20B:
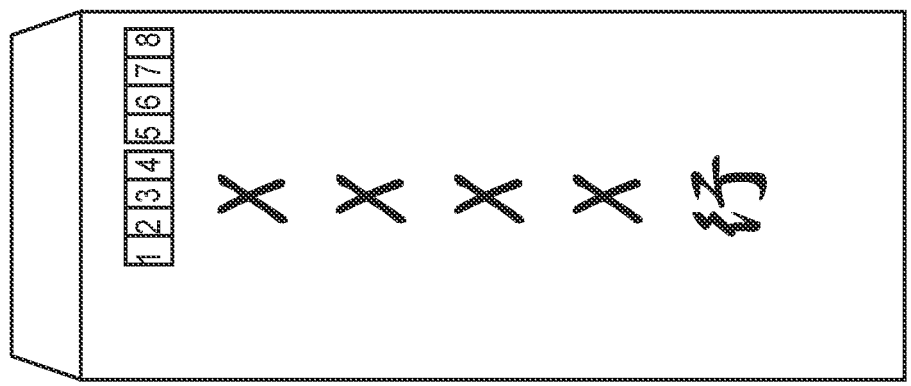
Figure 20A:
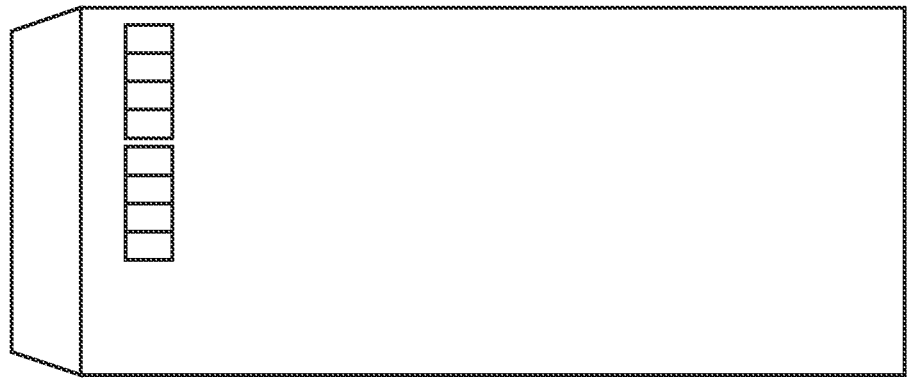

The process advances to step S1715, and the CPU 201 controls the printer engine 103 to perform printing control based on image data. At this time, the image is printed by shifting the image data output position by the offset amount in the sub-scanning direction. Accordingly, a printing result as shown in FIG. 20B can be acquired. If the image data output position is not shifted by the offset amount, the printing result becomes one as shown in FIG. 20C in which the positions of the address and postal code shift from correct positions. This is because, if an image rasterized in the memory 202 is printed on an envelope with its upper end aligned with the upper end of the envelope, similar to printing an image on paper other than an envelope, the image is not printed at a correct position owing to the presence of the flap of the envelope.

Figure 21:
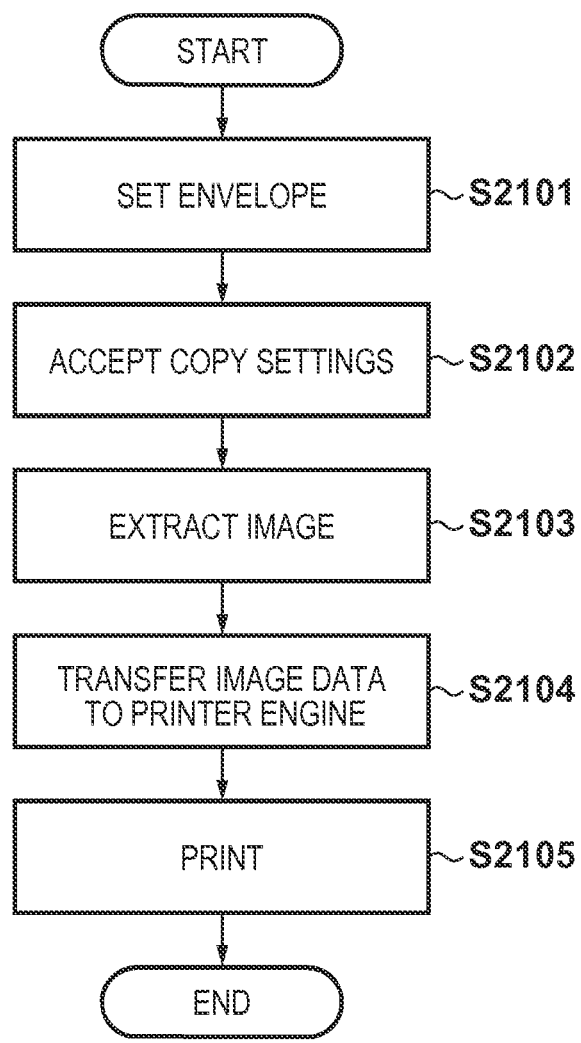
FIG. 21 is a flowchart showing a copy job processing sequence according to the embodiment.

FIG. 21 is a flowchart showing a copy job processing sequence according to the embodiment. This processing is implemented by executing a program stored in the ROM 210 or memory 202 by the CPU 201 of the controller 101.

First, in step S2101, the CPU 201 accepts envelope settings from the user. For example, an envelope of end-opening envelope (long format) 3 shown in FIG. 18A is set on the manual feed tray 304. The flap sizes in Table 1 and Table 3 are updated in accordance with a numeric value entered by the user. This is the same as that described with reference to FIGS. 15A, 15B, and 16, and a description thereof will not be repeated.

Then, the process advances to step S2102, and the CPU 201 accepts various settings of the copy job from the user via the operation unit 106. The setting contents include the copy count, paper feed source, paper size, single-sided/double-sided printing, enlargement/reduction ratio, sort output, and stapling/no-stapling. Thereafter, the process advances to step S2103. If the user inputs a copy start instruction via the operation unit 106, the CPU 201 controls the scanner 102 via the bus 209 to perform a document image data reading operation. At this time, the CPU 201 acquires a paper size (envelope size) designated by the copy job, and determines whether there is an envelope size managed in Table 3 that coincides with the acquired size. If a coincident size exists, the CPU 201 acquires a flap size corresponding to the envelope size. When a normal paper size is designated, the size of an image captured from the scanner 102 is equal to this paper size. However, for an envelope size with a flap size, image data of a size acquired by adding the flap size to the envelope size is captured from the scanner 102. The CPU 201 stores the captured image data in the memory 202.

FIG. 18A is a view showing an envelope size of end-opening envelope (long format) 3 when an envelope of end-opening envelope (long format) 3 is set as the envelope size. FIG. 18B is a view showing an image of the envelope.

End-opening envelope (long format) 3 is defined by a size of 120 mm×235 mm. Assume that the flap size is set to 30 mm. In this case, therefore, image data from the scanner 102 is stored in the memory 202 at a size of 120 mm×265 mm. When no flap size is set, the flap size becomes 0 mm and thus image data having a data size of 120 mm×235 mm is stored in the memory 202.

The process then advances to step S2104, and the CPU 201 transfers the image data in the memory 202 to the printer engine 103 at an appropriate timing while controlling the printer engine 103 via the bus 209. The process advances to step S2105, and the controller 101 controls the printer unit 302 to convey a sheet (envelope) from a paper feed source designated by the copy setting, and print the image data.

Accordingly, a printing result as shown in FIG. 20B is acquired. Even when an envelope of end-opening envelope (long format) 3 is set on the document table with its flap opened, an image at a size including the flap size can be copied without loss.

Figure 22:
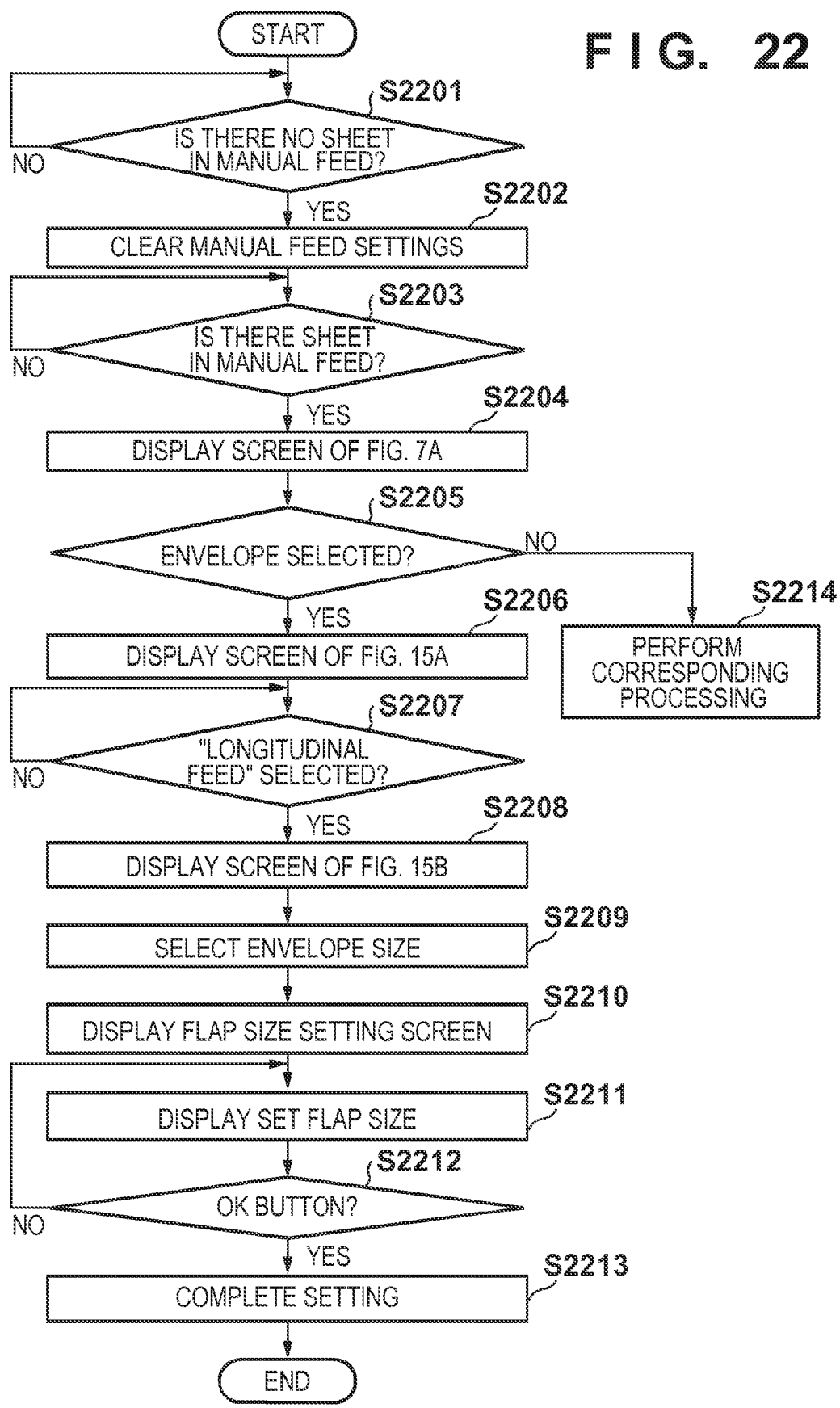
FIG. 22 is a flowchart for explaining processing in the MFP according to the embodiment when envelopes on the manual feed tray run out during printing on envelopes supplied from the manual feed tray.

FIG. 22 is a flowchart for explaining processing in the MFP according to the embodiment when envelopes on the manual feed tray run out during printing on envelopes supplied from the manual feed tray. This processing is implemented by executing a program stored in the ROM 210 or memory 202 by the CPU 201 of the controller 101.

First, if the CPU 201 learns from the sensor 504 in step S2201 that sheets (envelopes in this case) run out during printing on envelopes supplied from the manual feed tray 304, it advances the process to step S2202. In step S2202, the CPU 201 clears information such as the size set for the manual feed tray 304. At this time, the CPU 201 stores, in the memory 202 in association with the envelope size set for the manual feed tray 304, information of the flap size set for the manual feed tray 304. After the processing in step S2202, the settings of the manual feed tray change as shown in Table 1. The process advances to step S2203, and when the operator sets sheets (envelopes) on the manual feed tray 304, the sensor 504 detects this and the CPU 201 determines that sheets exist. The process then advances to step S2204, and the CPU 201 displays the screen shown in FIG. 7A. The CPU 201 waits until the operator presses the "envelope" button 610 in step S2205. If the operator presses the "envelope" button 610, the process advances to step S2206, and the CPU 201 displays the screen in FIG. 15A. If the operator selects the "longitudinal feed" 1403 in the screen of FIG. 15A in step S2207, the process advances to step S2208, and the CPU 201 displays the screen in FIG. 15B. If the operator selects an envelope size and presses the "Next" button 1410 in step S2209, the process advances to step S2210, and the CPU 201 displays the flap size setting screen in FIG. 16. At this time, for example, if "end-opening envelope (long format) 3" has been selected in step S2209, the CPU 201 reads out a corresponding flap size (30.0 mm here) from Table 4 or Table 5 in the memory 202. The process advances to step S2211, and the CPU 201 presents "30.0" mm set in advance in the flap size input area 1413 in the setting screen of FIG. 16. If the operator presses the "OK" button 1415, the process advances to step S2213, and the CPU 201 finalizes the envelope size "end-opening envelope (long format) 3" and a flap size at this time. If the operator does not press the "envelope" button 610 in step S2205, the process advances to step S2214, and the CPU 201 executes processing corresponding to the pressed button.

In the embodiment, the paper containing unit is not a cassette but a manual feed tray. However, the present invention is not limited to this and is similarly applicable to a paper cassette.

As described above, information of a previously set flap size is saved, and the flap size can be called and used in next setting. This can minimize cumbersome setting of a flap size and the like which become necessary because an envelope can be conveyed by long-edge feed and short-edge feed. Further, the same operability as that for standard sheets other than an envelope can be acquired.

Other Embodiments

The above-described embodiment has explained an example in which information of a previously set flap size is saved for each envelope type, and the flap size is called and used in next setting. However, the present invention is not limited to this. For example, not only a previously set value, but also a plurality of previously set flap sizes may be saved, and when the user newly sets sheets on a paper feed source, he may select and set a flap size of his choice from the plurality of flap sizes. The user can easily set a flap size which differs between manufacturers, further reducing the labor of the user.

In the embodiment, when the user selects an envelope size in step S2209, a flap size corresponding to the selected envelope size is presented. However, the present invention is not limited to this. For example, when the size of an envelope set in a paper feed source can be automatically detected, the CPU 201 may present, to the user, in response to setting of an envelope in a paper feed source, the size of the envelope set in the paper feed source and a flap size corresponding to the envelope size, and prompt him to select the flap size. When the size of an envelope set in a paper feed source can be automatically detected, the CPU 201 may automatically set, in response to setting of an envelope in a paper feed source, the size of the envelope set in the paper feed source and a flap size saved in association with the envelope size. If the number of flap sizes set previously is one, the process may advance to step S2213 without waiting for pressing of the "OK" button 1415 by the user in step S2212. That is, the CPU 201 may automatically finalize the envelope size "end-opening envelope (long format) 3" and a flap size at this time.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-035466, filed Feb. 21, 2012, which is hereby incorporated by reference herein in its entirety.

What is claimed is:

1. A printing apparatus capable of printing an image on an envelope of plural sizes, comprising:
    a holding unit, constructed to be capable of holding an envelope;
    an accepting unit, constructed to accept, based on that an envelope is set on the holding unit, a specific a size of an envelope and a length of a flap of an envelope from a user via an operation unit;
    a storing unit, constructed to store, in a memory, the size and the length accepted by the accepting unit in association with the holding unit;
    a printing unit, constructed to print the image on the envelope held by the holding unit, based on the size and the length stored in the memory; and
    a clearing unit constructed to clear, based on that the envelope held by the holding unit runs out, an association of the size and the length stored in the memory with the holding unit,
    wherein after the association of the size and the length stored in the memory with the holding unit is cleared by the clearing unit, the size and the length are still stored in the memory in association with each other, wherein the accepting unit is further constructed to, in a case where an envelope is set on the holding unit and a size of an envelope accepted from a user matches the size stored in the memory, provide to a user the length that is stored in the memory in association;

wherein at least a part of the accepting unit, the storing unit, the printing unit and the clearing unit is implemented by a processor executing computer executable code stored in the memory.

2. The printing apparatus according to claim 1, wherein the accepting unit is constructed to display an operation screen for accepting the size and the length on the operation unit.

3. The printing apparatus according to claim 2, wherein the accepting unit is constructed to provide the length to a user on the operation screen.

4. The printing apparatus according to claim 1, wherein
the storing unit is constructed to be able to store, in the memory, plural lengths of a flap in association with one size of an envelope, and in a case where plural lengths are stored in association with a specific size that matches the size of an envelope accepted from a user, the sec-end accepting unit is constructed to provide the plural lengths to a user.

5. The printing apparatus according to claim 1, wherein the holding unit is a manual feed tray.

6. The printing apparatus according to claim 1, wherein the printing unit is constructed to shift a printing position of the image, based on the size and the length stored in the memory.

7. A control method for controlling a printing apparatus capable of printing an image on an envelope of plural sizes and having a holding unit constructed to be capable of holding an envelope, the method comprising:

accepting, based on that an envelope is set on the holding unit, a size of an envelope and a length of a flap of an envelope from a user via an operation unit;

storing, in a memory, the accepted size and the accepted length in association with the holding unit;

printing the image on the envelope held by the holding unit, based on the size and the length stored in the memory;

clearing, based on that the envelope held by the holding unit runs out, an association of the size and the length stored in the memory with the holding unit, wherein after the association of the size and the length stored in the memory with the holding unit is cleared, the size and the length are still stored in the memory in association with each other; and providing to a user, in a case where an envelope is set on the holding unit and a size of an envelope accepted from a user matches the size stored in the memory, the length that is stored in the memory in association with the accepted size.

8. A non-transitory computer-readable storage medium storing a computer program for causing a computer to execute steps of the method for controlling the printing apparatus capable of printing an image on an envelope of plural sizes and having a holding unit constructed to be capable of holding an envelope, the method comprising:

accepting, based on that an envelope being set on the holding unit, a size of an envelope and a length of a flap of an envelope from a user via an operation unit;

storing, in a memory, the accepted size and the accepted length in association with the holding unit;

printing the image on the envelope held by the holding unit, based on the size and the length stored in the memory;

clearing, based on that the envelope held by the holding unit runs out, an association of the size and the length stored in the memory with the holding unit, wherein after the association of the size and the length stored in the memory with the holding unit is cleared, the size and the length are still stored in the memory in association with each other; and providing to a user, in a case where an envelope is set on the holding unit and a size of an envelope accepted from a user matches the size stored in the memory, the length that is stored in the memory in association with the accepted size.

* * * * *